(12) United States Patent
Kato et al.

(10) Patent No.: US 6,833,115 B2
(45) Date of Patent: Dec. 21, 2004

(54) METHOD OF DECOMPOSING POLLUTANTS AND APPARATUS FOR THE SAME

(75) Inventors: Kinya Kato, Kanagawa (JP); Masahiro Kawaguchi, Kanagawa (JP); Akira Kuriyama, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 337 days.

(21) Appl. No.: 09/988,105

(22) Filed: Nov. 19, 2001

(65) Prior Publication Data

US 2002/0068845 A1 Jun. 6, 2002

(30) Foreign Application Priority Data

Nov. 21, 2000 (JP) ........................................ 2000-354343
Nov. 21, 2000 (JP) ........................................ 2000-354344

(51) Int. Cl.[7] .............................................. B01J 19/08
(52) U.S. Cl. ....................... 422/121; 588/212; 588/227; 588/247; 210/748
(58) Field of Search ........................ 422/121; 588/212, 588/227, 247; 210/748

(56) References Cited

U.S. PATENT DOCUMENTS 6,136,203 A * 10/2000 Butters et al. ............... 210/743
6,180,014 B1 * 1/2001 Salama ........................ 210/748
6,558,639 B1 * 5/2003 Watanabe et al. ......... 422/186.3

FOREIGN PATENT DOCUMENTS

EP          1 010 453 A1      6/2000

* cited by examiner

Primary Examiner—Kishor Mayekar
(74) Attorney, Agent, or Firm—Fitzpatrick, Cella, Harper & Scinto

(57) ABSTRACT

The present invention enables efficient decomposition work without involving burdensome operations of carrying out decomposition of undecomposed pollutants discharged at the time of starting decomposition processing and undecomposed pollutants remaining at the time of interruption and termination of decomposition processing, separately from primary decomposition. At the time of starting decomposition, the steps of supplying a substance having a function to decompose the pollutant to a decomposition area, irradiating the decomposition area with light and supplying a decomposition target substance to the reaction area are carried out in the described order, while at the time of ending start of decomposition, the operations of supplying the decomposition target substance, irradiating the decomposition area with light and supplying the substance having a function to decompose the pollutant to the decomposition area are carried out in the described order.

26 Claims, 16 Drawing Sheets

METHOD OF DECOMPOSING POLLUTANTS AND APPARATUS FOR THE SAME

BACKGROUND OF THE INVENTION

1. Field of the Invention

The present invention relates to a method of decomposing pollutants such as gaseous halogenated aliphatic compounds and an apparatus for use in the method.

2. Related Background Art

An enormous amount of halogenated aliphatic hydrocarbon compounds (e.g. chlorinated ethylene, chlorinated methane) have been used in association with recent advancement of industrial technologies, and the disposal of these compounds has become a serious problem. Also, environmental problems of natural environment being polluted with gases from these compounds after use, and so on, have been caused, and considerable efforts have been expended in solving those problems.

As an example of apparatuses to contribute to the solution of the problems as described above, apparatuses for decomposing gaseous halogenated aliphatic hydrocarbon compounds in which a gas containing a chlorine gas is mixed with a gaseous halogenated aliphatic hydrocarbon compound to be decomposed, and the mixed gas is irradiated with light have been proposed (for example, Europe Patent Publication EP100453A1). Here, as simple and safe means for obtaining a gas containing a chlorine gas, a chlorine gas generated from a solution containing chlorine is used.

FIG. 1 is a schematic diagram of one aspect thereof, wherein reference numeral 11 denotes means for generating air containing a chlorine gas, which comprises a water bath 12 containing a chlorine solution, a pipe 13 for passing air through the solution, and a valve 14 to adjust the amount of air. And, the air passed through the chlorine solution becomes air containing a chlorine gas, and is introduced into a reaction baths 5. Reference numeral 1 denotes an apparatus for supplying a gas to be decomposed, and the gas to be decomposed is introduced into the reaction bath 5, and is mixed with the air containing a chlorine gas in the reaction bath 5, and the mixed gas is irradiated with light for a predetermined time period by light-irradiating means 4, whereby the gas to be decomposed is decomposed. The decomposed gas is discharged from an exhaust pipe 6.

For the chlorine solution that is put in the water bath 12, a solution with the concentration of hydrogen ions (pH value) being in the range of from 1 to 4 and the concentration of chlorine being in the range of from 5 to 150 mg/l, or the like, is used. Such a solution can be obtained by dissolving a hypochlorite (sodium hypochlorite and potassium hypochlorite) in water, for example. Also, chlorine gas can be generated efficiently if an inorganic acid or the like is contained in this solution.

Also, a pair of electrodes is put in water containing an electrolyte, and an electric potential is applied therebetween, whereby a solution having the above described properties can be produced near the positive electrode. The water produced by such electrolysis is called electrolytic water, functional water or the like, and apparatuses for producing such water are commercially available for use in disinfections and the like. As shown in FIG. 2, functional water at a positive electrode 23 by a functional water production apparatus 21 constituted by an electrolytic device 22 is continuously supplied at a desired flow rate to the chlorine gas generation bath 11 through a pump 25 and a pipe 26. In this figure, reference numeral 24 denotes a negative electrode, and reference numeral 27 denotes a partition wall for separating the positive electrode side from the negative electrode side. A gas to be passed is continuously supplied at a desired flow rate to the chlorine gas generation bath 11 through a supply pipe 13 and a pump 14. As a result, a gas containing chlorine gas is discharged from an outlet pipe 3. This gas containing chlorine is introduced into the reaction bath 5, and thereafter the compound to be decomposed is decomposed in a way as described above. Also, functional water used in this processing is discharged from the chlorine generation bath 11 to a tank 8. For a method in which air is passed through a chlorine solution to generate air containing chlorine gas in this way, it is not necessary to prepare a chlorine container or the like, chlorine can be supplied safely, conveniently and stably.

However, in the above mentioned apparatus for decomposing gaseous halogenated aliphatic hydrocarbon compounds, a chlorine gas supplied from water or the like containing chlorine is mixed with a gaseous halogenated aliphatic hydrocarbon compound as a decomposition target substance under irradiation with light, thereby carrying out decomposition reaction, and in particular pollutant gases are purged. In this apparatus, if a configuration in which the decomposition target substance is first introduced into the reaction vessel, and the substance is discharged without being decomposed before decomposition reaction occurs is employed, an additional specific operation for subjecting the decomposition target substance to detoxication processing is required.

Also, if the decomposition target substance in the reaction vessel, which is still in the course of decomposition, remains undecomposed when operation of the apparatus is stopped due to interruption and termination of purification processing, an additional specific operation for processing of collection and detoxication of this left decomposition target substance.

SUMMARY OF THE INVENTION

The present invention has as its object the provision of a method of decomposing pollutants that enables the above described problems to be solved, and an apparatus for the same.

According to an aspect of the present invention, there is provided a method of decomposing substances to be decomposed in which a decomposition target substance and a decomposition promoting substance having a function to decompose the decomposition target substance under irradiation with light are introduced into a decomposition area for decomposing the decomposition target substance, and those substances are contacted with each other under irradiation with light to decompose the decomposition target substance, the method comprising the steps of:

(a) introducing the decomposition promoting substance into the decomposition area;

(b) Irradiating the decomposition area with light; and (c) introducing the decomposition target substance into the decomposition area, wherein the steps are started in the order of the steps (a), (b) and (c), the step (a) the earliest, at the time of starting the operation of decomposing the decomposition target substance, and the steps are stopped in the order of (c), (b) and (a), the step (c) the earliest, at the time of ending the operation of decomposing the decomposition target substance.

According to another aspect of the present invention, there is provided an apparatus for decomposing substances to be decomposed in which a decomposition target substance and a decomposition promoting substance having a function to decompose the decomposition target substance under irradiation with light are introduced into a decomposition area for decomposing the decomposition target substance, and those substances are contacted with each other under irradiation with light to decompose the decomposition target substance, comprising:

a decomposition unit comprised of the decomposition area;

a decomposition promoting substance introduction unit (d) for introducing the decomposition promoting substance into the decomposition area;

a light-irradiation unit (e) for irradiating the decomposition area with light;

a decomposition target substance introduction unit (f) for introducing the decomposition target substance into the decomposition area; and a drive unit for driving the decomposition promoting substance introduction unit (d), the light-irradiation unit (e) and the decomposition target substance introduction unit (f) individually, wherein the drive unit starts driving the decomposition promoting substance introduction unit (d), the light-irradiation unit (e) and the decomposition target substance introduction unit (f) in the described order at the time of starting the operation of decomposing the decomposition target substance, and stops the operated decomposition target substance introduction unit (f), the operated light-irradiation unit and (e) the operated decomposition promoting substance introduction unit (d) in the described order at the time of ending the operation of decomposing the decomposition target substance.

According to still another aspect of the present invention, there is provided a method of decomposing substances to be decomposed in which a decomposition target substance and a decomposition promoting substance having a function to decompose the decomposition target substance under irradiation with light are introduced into a decomposition area for decomposing the decomposition target substance, and those substances are contacted with each other under irradiation with light to decompose the decomposition target substance, the method comprising the steps of:

(a) introducing the decomposition promoting substance into the decomposition area;

(b) irradiating the decomposition area with light; and (c) introducing the decomposition target substance into the decomposition area, wherein the steps are started in the order of the steps (a), (b) and (c), the step (a) the earliest, at the time of starting the operation of decomposing the decomposition target substance.

According to a further aspect of the present invention, there is provided a method of decomposing substances to be decomposed in which a decomposition target substance and a decomposition promoting substance having a function to decompose the decomposition target substance under irradiation with light are introduced into a decomposition area for decomposing the decomposition target substance, and those substances are contacted with each other under irradiation with light to decompose the decomposition target substance, the method comprising the steps of:

(a) introducing the decomposition promoting substance into the decomposition area;

(b) irradiating the decomposition area with light; and (c) introducing the decomposition target substance into the decomposition area, wherein the steps are stopped in the order of the steps (c), (b) and (a), the step (c) the earliest, at the time of stopping the operation of decomposing the decomposition target substance.

According to a further aspect of the present invention, there is provided an apparatus for decomposing substances to be decomposed in which a decomposition target substance and a decomposition promoting substance having a function to decompose the decomposition target substance under irradiation with light are introduced into a decomposition area for decomposing the decomposition target substance, and those substances are contacted with each other under irradiation with light to decompose the decomposition target substance, comprising:

a decomposition unit comprised of the decomposition area;

a decomposition promoting substance introduction unit (d) for introducing the decomposition promoting substance into the decomposition area;

a light-irradiation unit (e) for irradiating the decomposition area with light;

a decomposition target substance introduction unit (f) for introducing the decomposition target substance into the decomposition area; and a drive unit for driving the decomposition promoting substance introduction unit (d), the light-irradiation unit (e) and the decomposition target substance introduction unit (f) individually, wherein the drive unit starts driving the decomposition promoting substance introduction unit (d), the light-irradiation unit (e) and the decomposition target substance introduction unit (f) in the described order at the time of starting the operation of decomposing the decomposition target substance.

According to a further aspect of the present invention, there is provided an apparatus for decomposing substances to be decomposed in which a decomposition target substance and a decomposition promoting substance having a function to decompose the decomposition target substance under irradiation with light are introduced into a decomposition area for decomposing the decomposition target substance, and those substances are contacted with each other under irradiation with light to decompose the decomposition target substance, comprising:

a decomposition unit comprised of the decomposition area;

a decomposition promoting substance introduction unit (d) for introducing the decomposition promoting substance into the decomposition area;

a light-irradiation unit (e) for irradiating the decomposition area with light;

a decomposition target substance introduction unit (f) for introducing the decomposition target substance into the decomposition area; and a drive unit for driving the decomposition promoting substance introduction unit (d), the light-irradiation unit (e) and the decomposition target substance introduction unit (f) individually, wherein the drive unit stops the operated decomposition target substance introduction unit (f), the operated light-irradiation unit and (e) the operated decomposition promoting substance introduction unit (d) in the described order at the time of ending the operation of decomposing the decomposition target substance.

DETAILED DESCRIPTION OF THE PREFERRED EMBODIMENTS

Figure 1:
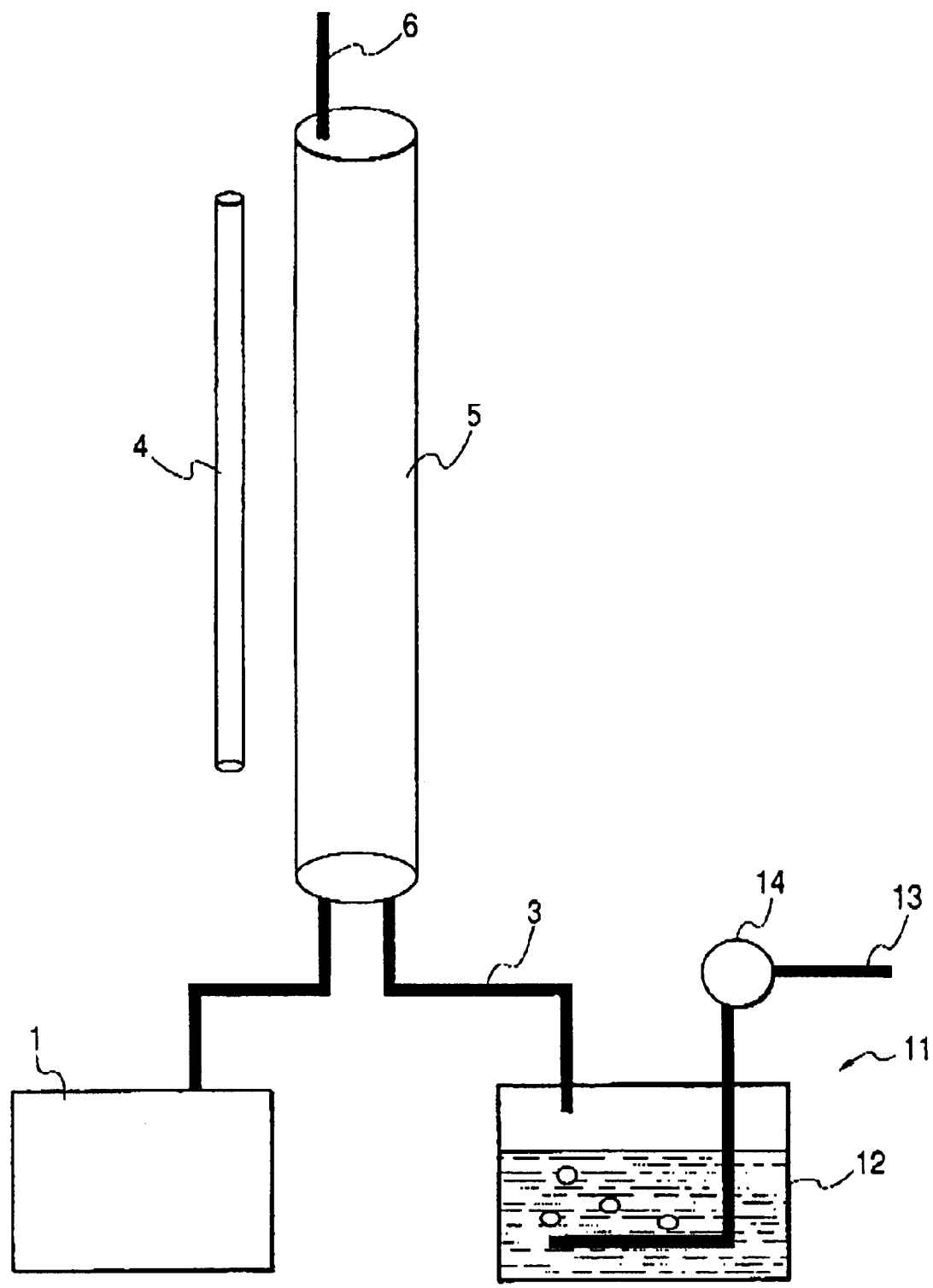
FIG. 1 is a schematic diagram showing a configuration of a conventional apparatus for decomposing pollutants.
Figure 2:
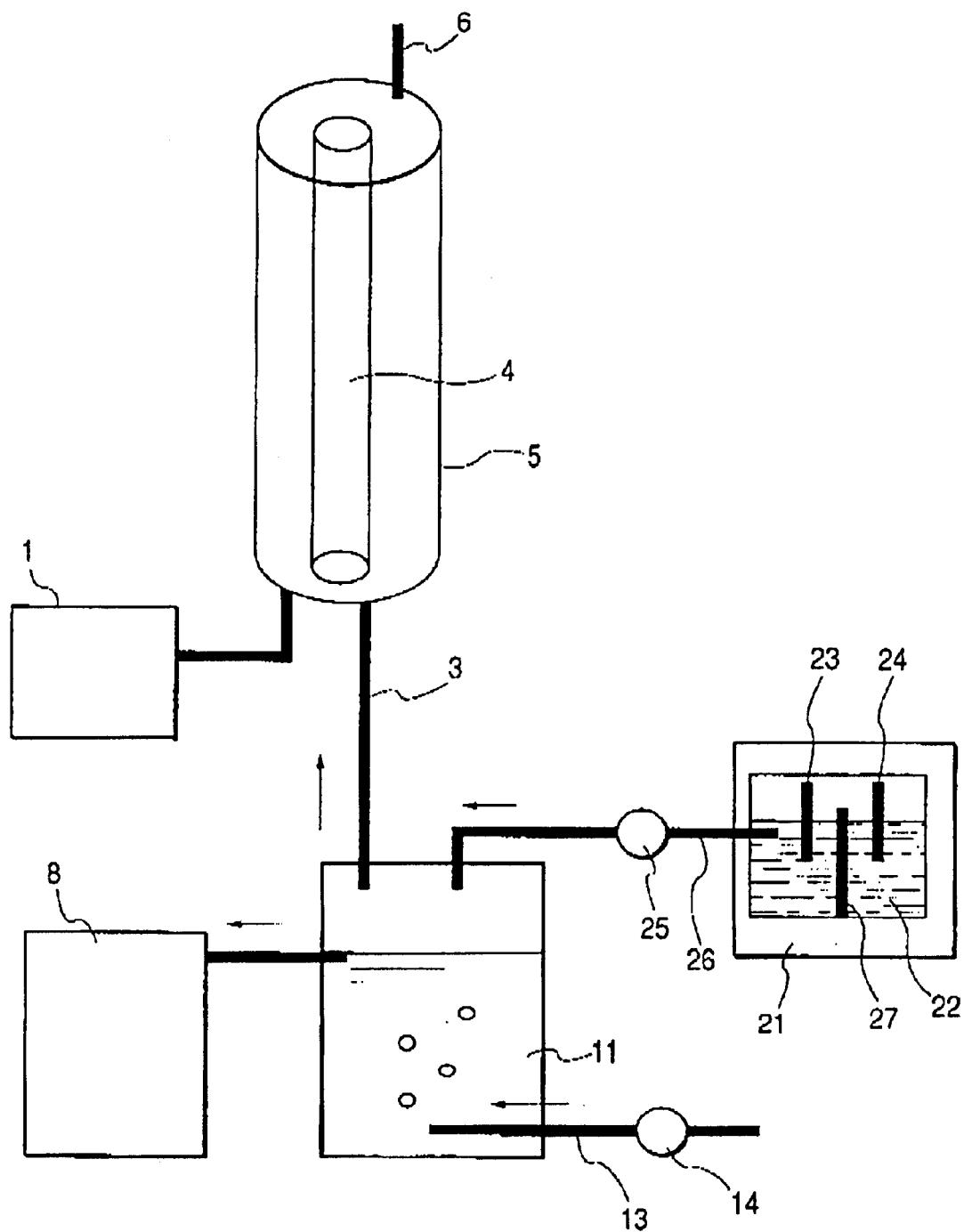
FIG. 2 is a schematic diagram showing a configuration of one embodiment of the conventional apparatus for decomposing pollutants.

The present invention will be described below referring to the drawings, taking the case as an example where a halogenated aliphatic hydrocarbon compound is used as a pollutant to be decomposed and chlorine is used as a substance to decompose the pollutant. Furthermore, the present invention is not limited thereto, but may be applied to any combination of substances capable of decomposition processing similar to that with the combination of a halogenated aliphatic hydrocarbon compound and chlorine described below.

Materials for use in decomposition processing in the present invention and an apparatus for the same, and the like will be described below.

(Description of Functional Water)

Functional water as a chlorine solution capable of being used in the present invention preferably has properties such that, for example, the hydrogen ion concentration (pH value) is in the range of from 1 to 4, preferably from 2 to 3, and the concentration of residual chlorine is in the range of from 5 mg/L to 300 mg/L, preferably from 30 mg/L to 120 mg/L.

Figure 3:
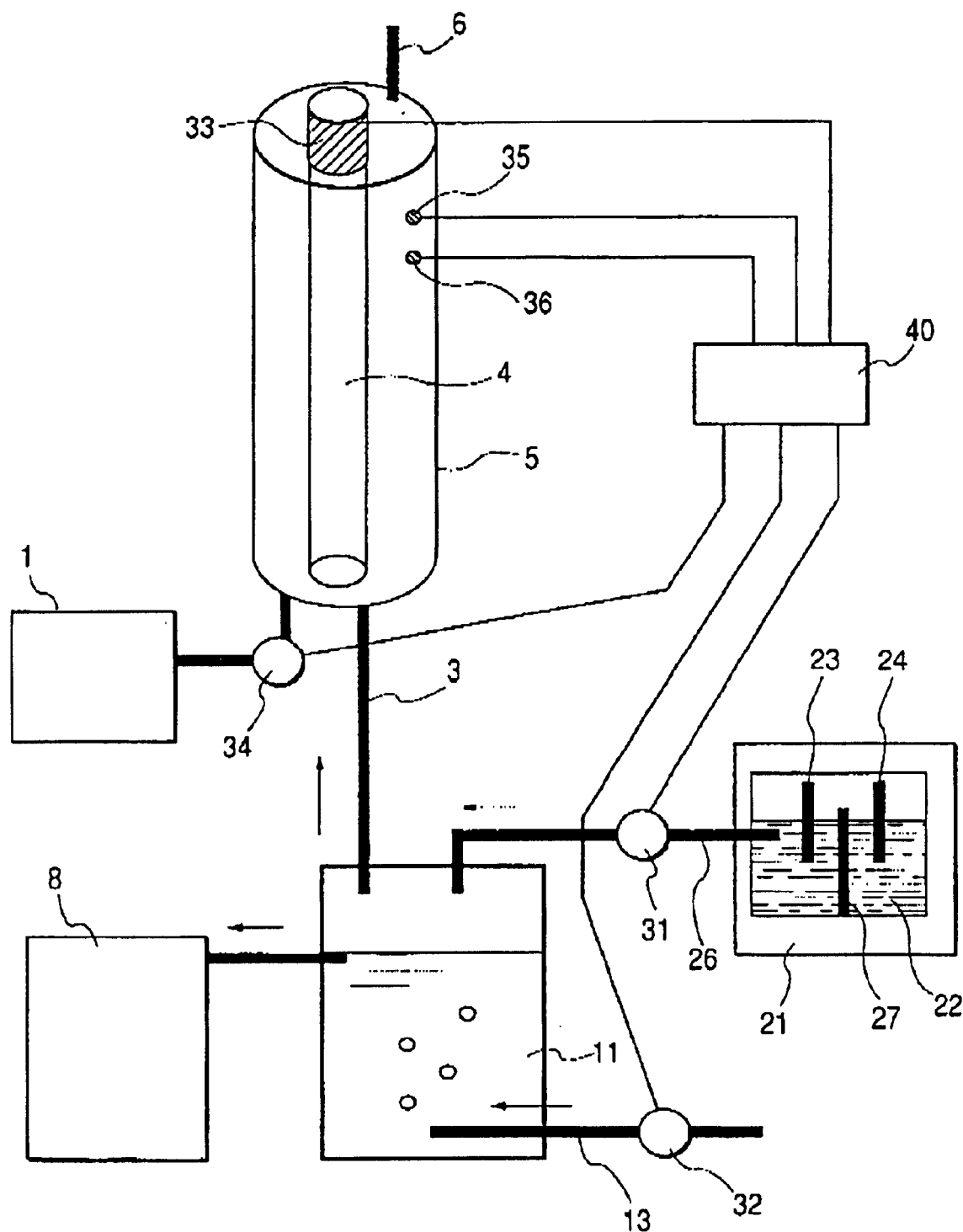
FIG. 3 is a schematic diagram showing the configuration of one embodiment of the apparatus for decomposing pollutants, relating to the present invention.
Figure 5:
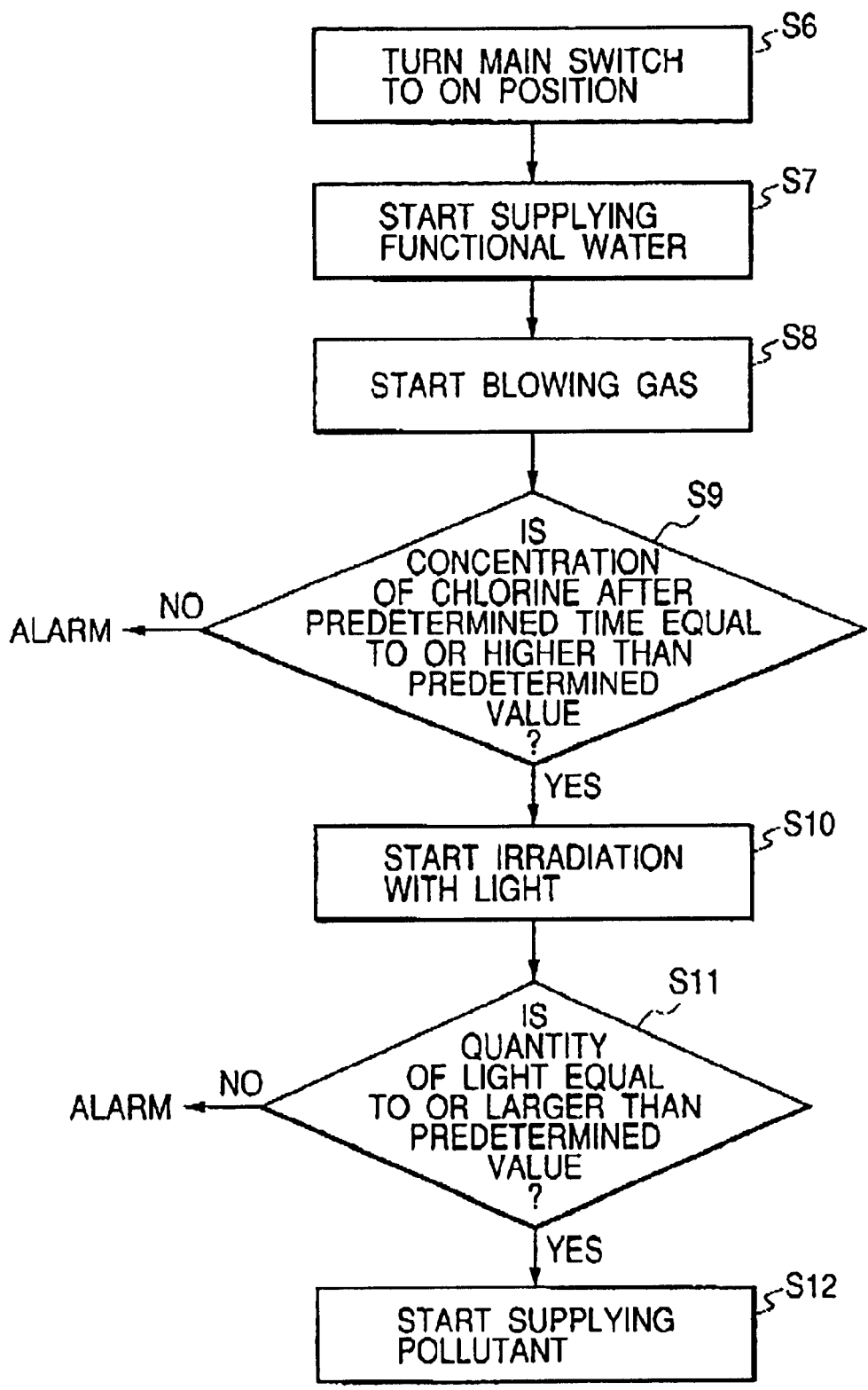
FIG. 5 is a flowchart showing another embodiment of the operation procedure of each means in the apparatus shown in FIG. 3.

By dissolving an electrolyte (e.g. sodium chloride, potassium chloride, etc.) in raw water, and subjecting the water to electrolysis in a water bath having a pair of electrodes, functional water having properties as described above can be obtained from the positive electrode side. The concentration of the electrolyte in the raw water before electrolysis is preferably in the range of from 20 mg/L to 2000 mg/L, more preferably from 200 mg/L to 1000 mg/L for sodium chloride, for example. Also, at this time, if a separating membrane 27 shown in FIGS. 3 and 5 is placed between a pair of electrodes, acidic water produced near the positive electrode can be prevented from being mixed with alkaline water produced near the negative electrode.

For the separating membrane, for example, an ion exchange membrane or the like is suitably used. And, for means for obtaining such functional water, a commercially available strong acidic electrolyte generator (e.g. Trade name: Oasis Biohalf; manufactured by Asahi Glass Engineering Co., Ltd., Trade name: Strong Electrolyte Generator (Mode 1 FW-200); manufactured by Amano Co., Ltd., etc.) may be used.

This solution is called electrolytic water, electrolytic functional water, functional water or the like, and is used for the purpose of disinfections.

The chlorine solution having above described properties, namely functional water can also be prepared from a reagent using hypochlorous acid or the like, For example, the functional water can be obtained by using 0.001 mol/L to 0.1 mol/L of hydrochloric acid, 0.005 mol/L to 0.02 mol/L of sodium hydrochloride and 0.0001 mol/L to 0.01 mol/L of sodium hypochlorite.

Also, functional water of 2000 mg/L with pH of 4.0 or less and the chlorine concentration of 2 mg/L or more can be prepared with hydrochloric acid and a hypochlorite. For example, the functional water can be obtained by using 0.001 mol/L to 0.1 mol/L of hydrochloric acid and 0.0001 mol/L to 0.01 mol/L of sodium hypochlorite.

Other inorganic or organic acids may be used instead of the above described hydrochloric acid. For inorganic acids, fluoric acid, sulfuric acid, phosphoric acid, boric acid, etc. may be used, and for the organic acids, acetic acid, formic acid, malic acid, citric acid, oxalic acid, etc. may be used Also, $N_3C_3O_3NaCl_2$ that is now on the market as a weak acidic water forming powder (e.g. Trade name: Quinosan 21X (manufactured by Clean Chemical Co., Ltd.), or the like may be used to produce functional water.

Here, raw water for use in preparation of functional water includes tap water, river water and seawater. The pH of these water is usually in the range of from 6 to 8, and the chlorine concentration thereof is smaller than 1 mg/L at most, and as a matter of course, such raw water has no capability of decomposing the organic chlorine compounds as described above.

(Concentration of Chlorine Gas and Chlorine Gas Generating Means)

A chlorine gas for decomposing a pollutant as a decomposition target substance under irradiation with light required for decomposition can be generated from the above described chlorine solution or functional water. As a gas containing chlorine gas, for example, air containing a chlorine gas obtained by passing air through the functional water may also be used. The pollutant is mixed therewith, and is irradiated with light, whereby the pollutant can be decomposed.

Also, a gas containing a pollutant and chlorine gas may be obtained by passing air containing the pollutant through the functional water instead of passing air. In this case, a gas containing a relatively high concentration of chlorine can be obtained.

And, an adjustment is preferably made so that the initial concentration of chlorine gas in the gas containing the pollutant and chlorine is in the range of from 20 ppmv to 500 ppmv or lower, and depending on the concentration of the pollutant, pollutant decomposition efficiency is remarkably enhanced if the concentration of chlorine gas in the gas is particularly in the range of from 50 ppmV to 200 ppmV.

For such generation/supply of chlorine gas, methods by electrolysis and methods by preparation of chemicals as described above may be used, but chlorine gas may be diluted to directly obtain a desired concentration of chlorine gas, using a chlorine bomb, cartridge or the like. In other words, as long as the above described range of chlorine concentrations can be achieved, an optimum method to achieve this range may be selected depending on situations.

(Means for Passing Gas Through Functional Water)

When a gas containing a pollutant and/or a gas for aeration are passed through functional water, an air diffuser (bubbler) may be used. The air diffuser may be a usual apparatus that is used for passing gas through liquid, but it is preferable to select a kind of air diffuser so that the size of the bubble is large enough to cope with diffusion of chlorine.

Also, it is desirable that a material that does not react with components of functional water is selected for the material of the air diffuser. For example, a porous diffusion plate made from sintered glass, porous ceramics, sintered SUS 316, a net woven with fibrous SUS 316 and the like, and a sparger made from glass, pipes of SUS 316 and the like may be used.

There are a variety of factors such as the speed of aeration and the speed at which functional water is supplied, but in the case where generation of air containing chlorine is consistent with the area for decomposition reaction (reaction area), the ratio of the liquid phase in a treatment bath may be in the range from 5 to 30%, desirably from 10 to 20%. Also, in the case where generation of air containing chlorine is not consistent with the area for decomposition reaction, it is desirable that the ratio of the volume of the bath for generating the air containing chlorine to the volume of the bath in which decomposition reaction is carried out is approximately in the range of 1:2 to 1:9.

(Means for Supplying Functional Water to Reaction Area)

Figure 7:
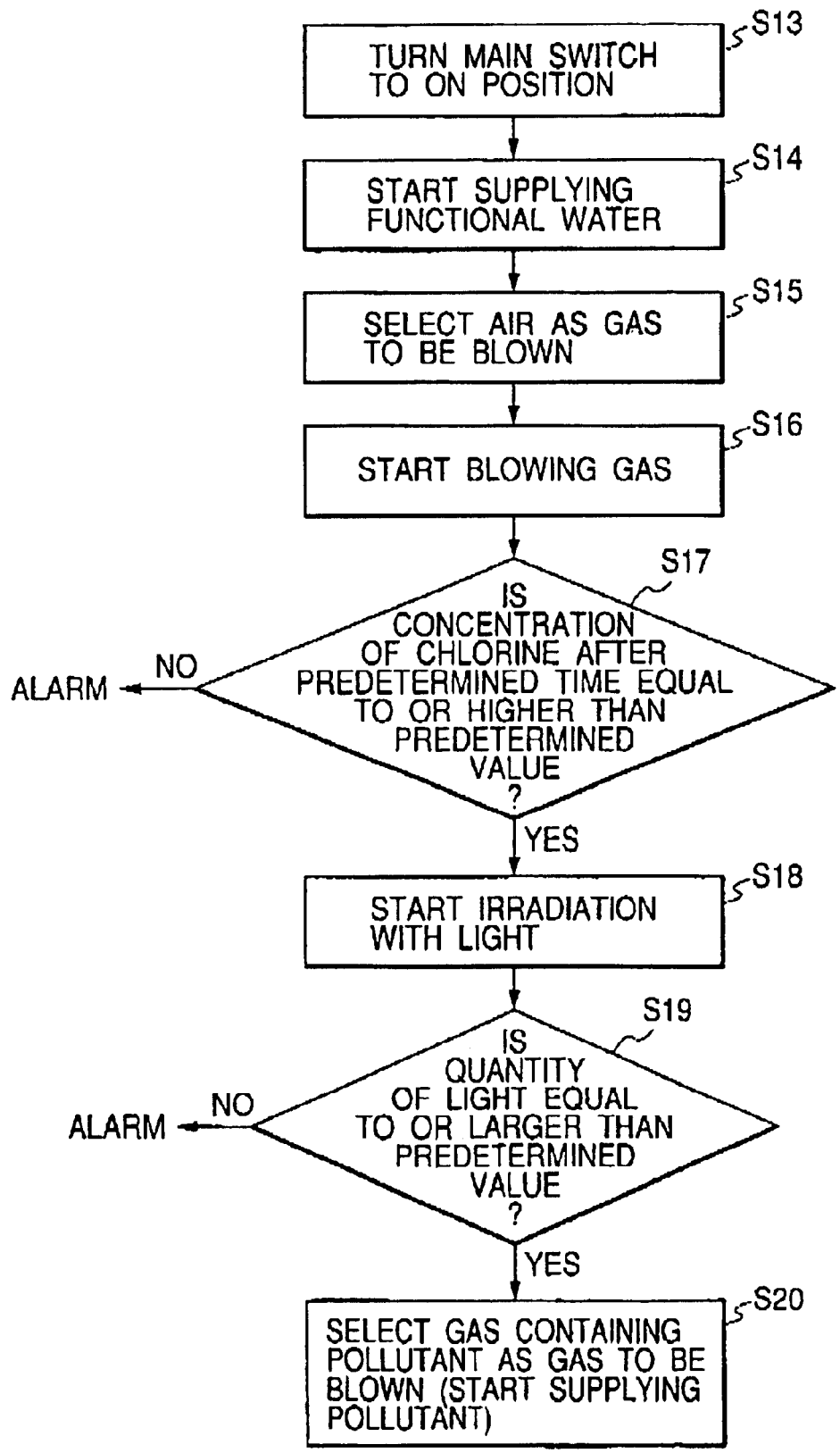
FIG. 7 is a flowchart showing the operation procedure of each means in the apparatus shown in FIG. 6.

In the case where a configuration as shown in FIG. 7, namely a configuration such that functional water is directly supplied in a gas phase reaction area to contact the functional water with a gas phase constituting the gas phase reaction area and to introduce chlorine from the functional water into the gas phase is used, a method may be used in which the functional water is atomized and supplied to the gas phase reaction area. For apparatuses for atomizing functional water for use in such a method, a variety of apparatuses may be used, and atomizing means by a heating steam system, a spray system, a system with shower spray nozzles, a supersonic system or the like may be used.

The diameter of droplets into which the water is atomized may be 1 mm or smaller, preferably in the range of approximately from $10^{-5}$ to $10^{-1}$ mm. Also, for effectively retaining the droplets in the gas phase reaction area to trap chlorine in the gas phase, filler may be packed in the gas phase reaction area. The temperature at which functional water is subjected atomization processing is not particularly limited, but may be in the range of from 4 to 50° C., preferably from 10 to 40° C.

(Decomposition Target Substance)

Here, the pollutant to be decomposed is a substance of which decomposition reaction is started under irradiation with light with the action of a decomposition promoting substance to decompose the pollutant, and if chlorine is used as the decomposition promoting substance as described above, for example, the decomposition target substance may be an organic chlorine compound, particularly a halogenated aliphatic hydrocarbon compound. Specific examples of halogenated aliphatic hydrocarbon compounds include, for example, chlorinated ethylene and chlorinated methane. Specifically, the chlorinated ethylene includes ethylene substituted with 1 to 4 chlorines, namely chloroethylene, dichloriethylene (DCE), trichloroethylene (TCE) and tetrachloroethylene (PCE). In addition, dichloroethylene may include, for example, 1,1-dichloroethylene (vinylidene chloride), cis-1,2-dichloroethylene and trans-1,2-dichloroethylene. Also, chlorinated methane includes chlorine-substituted methane, for example, chloromethane, dichloromethane and trichloromethane.

Pollutants containing an organic chlorine compound to be decomposed are not particularly limited, the invention may be applied to purification of wastewater and exhaust gas from coating plants and cleaning plants, and soils and groundwater polluted with the above described pollutants. For example, the invention may be used for removal of pollutants contained in gas generated during air stripping, vacuum extraction gas from polluted soils.

(Light-irradiating Means)

For light-irradiating means capable of being used in the present invention, for example, light with wavelengths of 300 to 500 nm is preferably used, and more preferably light with wavelengths of 350 to 450 nm is used. Also, for intensity of light irradiating the chlorine gas and decomposition target substance, decomposition is carried out at a level that is sufficient from a workable standpoint with the intensity of several hundreds $\mu W/cm^2$ (measured at between 300 nm and 400 nm) in the case of a light source having a peak in the vicinity of the wavelength of 360 nm, for example.

In the present invention, glass, plastic or the like can be used as a reaction bath because ultraviolet light with wavelengths of about 250 nm or shorter having a significant influence on the human body does not to be used at all.

And, for sources of this light, natural light (e.g. sunlight, etc.) or artificial light (mercury lamp, black light, color fluorescence lamp, light-emitting diode with short wavelengths (500 nm or shorter), etc.) may be used.

(Decomposition Reaction Mechanism)

The inventors have already found that decomposition of organic chlorine compounds is promoted if they are irradiated with light in the presence of chlorine gas, but the reaction mechanism thereof has been unknown for the most part. However, it is already known that if chlorine is exposed to light with wavelengths in some specific range, it is subjected to dissociation to produce a radical. Also in the present invention, it can be considered that the chlorine radical is produced, and is bonded to the decomposition target substance to cleave the linkage thereof.

Also, although oxygen is required for reactions in this applied invention, existence of oxygen radicals generated through decomposition of chlorine and water and normal oxygen in the air sufficiently satisfies this requirement.

(Embodiment 1)

The basic configuration of one embodiment of a decomposition apparatus relating to the present invention will be described below based on FIG. 3. In FIG. 3, reference numeral 5 denotes a reaction bath comprising a reaction vessel being a decomposition unit having a gas phase reaction area (decomposition area), which is a container for mixing air containing chlorine from a chlorine gas generation bath 11 with a gaseous halogenated aliphatic compound to be decomposed and containing the mixture therein, and the irradiation with light is conducted in the reaction bath 5. The gaseous halogenated aliphatic compound being a decomposition target substance is supplied from a decomposition target substance supplying means 1 comprising a decomposition target substance introduction unit.

Supplying of the decomposition target substance is controlled by a means 34 for controlling the supply of the decomposition target substance. Water containing chlorine (functional water) is continuously supplied at a desired flow rate to the chlorine gas generation bath 11 through a pipe 26 by means (a valve) 31 for controlling the supply of functional water. Here, the chlorine gas functions as a decomposition promoting substance to decompose a decomposition target substance, and the water containing chlorine is produced in a functional water production apparatus 21 comprised of a decomposition promoting substance introduction unit for introducing chlorine as a decomposition promoting substance into the above described decomposition area. A gas to be passed is continuously supplied at a desired flow rate to the chlorine generation bath 11 through a supply pipe 13 and means (a valve) for controlling gas passing. As a result, a gas containing chlorine gas is discharged from an outlet pipe 3. This gas containing chlorine is then introduced into the reaction bath 5, and is mixed with the decomposition target substance, and thereafter the inside of the reaction bath 5 is irradiated with light by means 4 (a light-irradiation unit) for irradiation with light to decompose the decomposition target substance. The irradiation with light performed by the means 4 is controlled by means 33 for controlling irradiation with light.

The means 31 for controlling the supply of functional water starts supply of functional water upon obtaining a start signal. The means 32 for controlling gas passing awaits a start signal for gas passing to start passing a gas. The means 33 for controlling irradiation with light awaits a start signal for irradiation with light to start irradiation with light. Reference numeral 34 denotes means (a valve) for controlling supply of a gas to be decomposed, and the supply of the gas to be decomposed is started upon reception of a start signal. Reference numeral 35 denotes chlorine concentration detecting means enabling the progress of work to be controlled based on detection data. The reference numeral 36 denotes a light amount detecting means enabling the progress of work to be controlled based on detection data.

Reference numeral 40 denotes controlling means, which comprises a computer having a CPU, ROM and RAM, receives signals from means 35, 36 and the like, and controls start of operations of means 31, 32, 33 and 34 following procedures based on programs previously stored in the above described ROM. Furthermore, the above described controlling means may be integrally incorporated as a part of the decomposition apparatus, but may also be an outboard computer without being integrally incorporated therein. Also, the above described control may be carried out using not only a computer but also so called an electric board as hardware.

Figure 4:
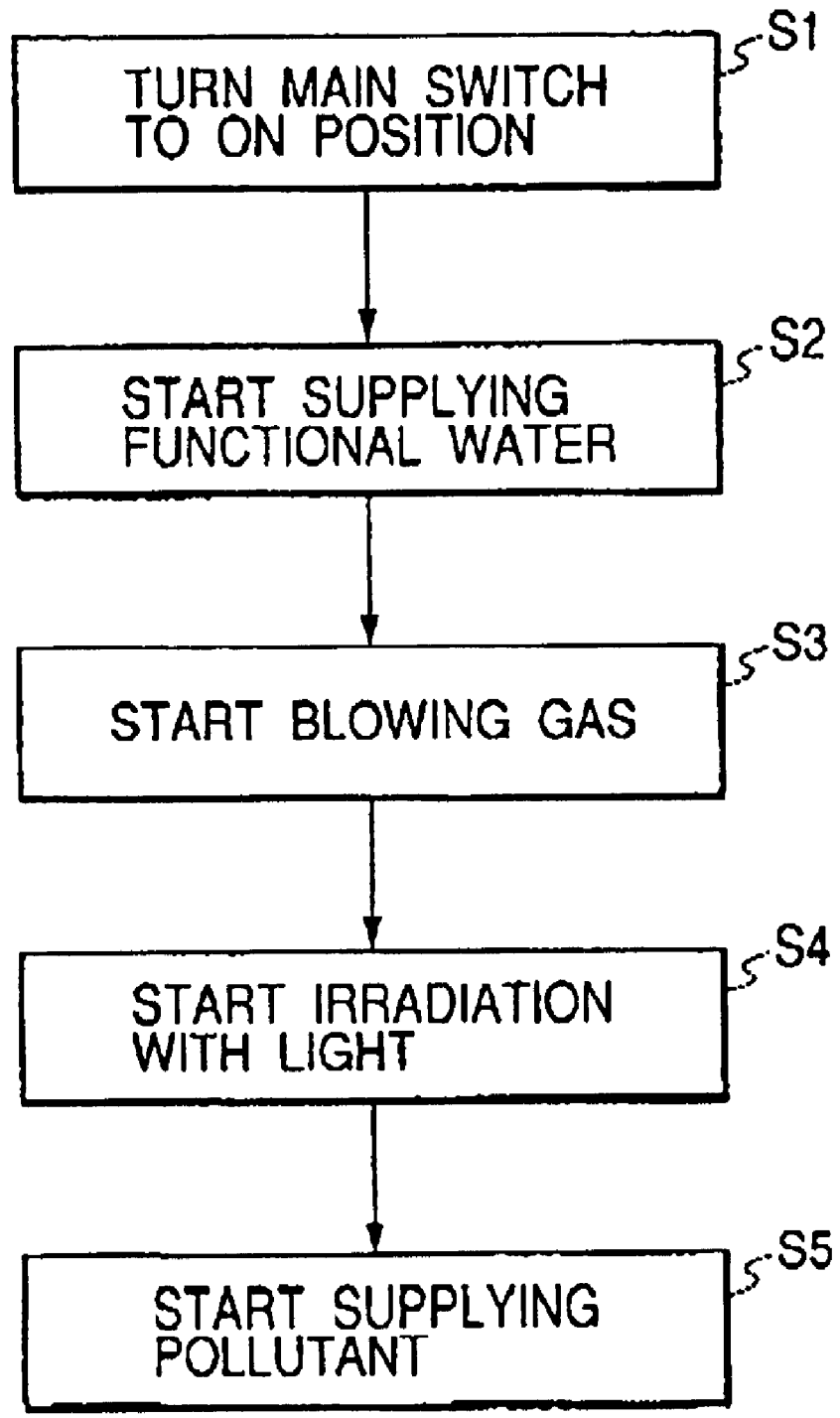
FIG. 4 is a flowchart showing the operation procedure of each means in the apparatus shown in FIG. 3.

The operation procedure for control that the above described controlling means 40 carries out in accordance with the above described programs will now be described using FIG. 4.

First, at step S1, a main switch is turned to the on position to start operation of this decomposition apparatus. That is, the above described controlling means receives information indicating the fact that the main switch has been turned to the on position, and carries out the procedure for starting decomposition processing. Then, at step S2, a start signal is sent to the means 31 for controlling the supply of functional water to start supply of functional water to the means 11.

Figure 16:
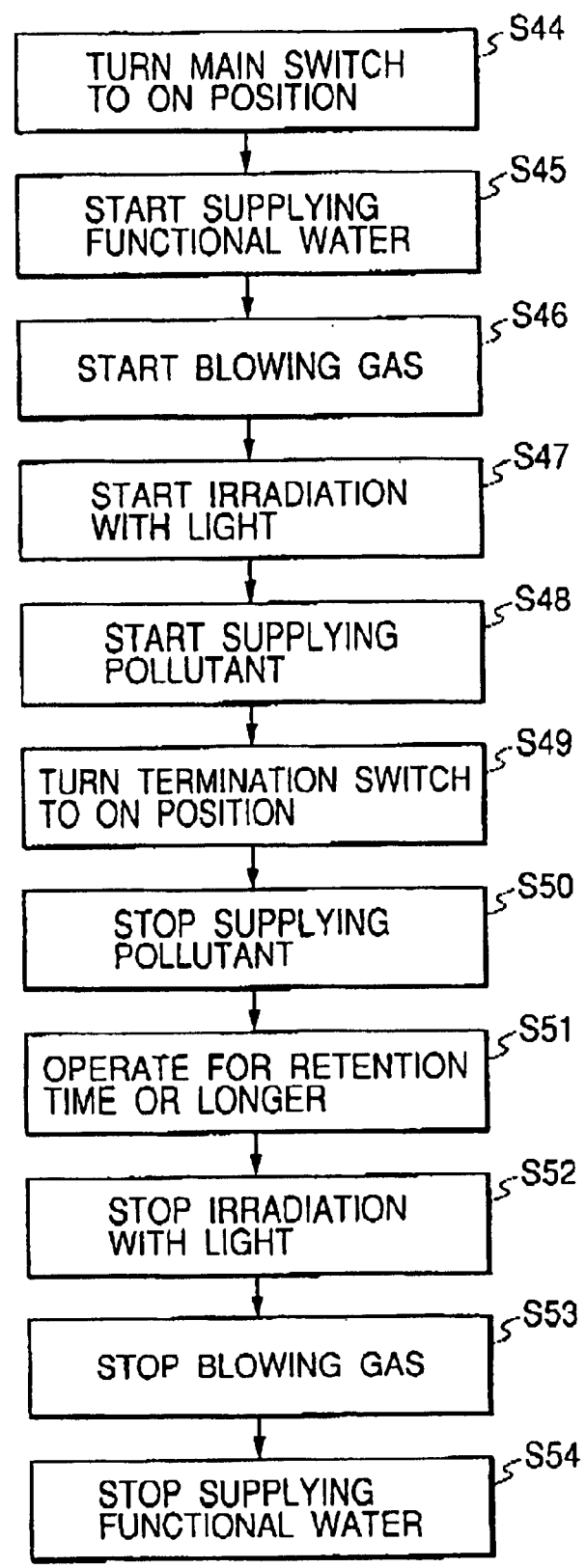
FIG. 16 is a flowchart showing the operation procedure of each means of the apparatus in Embodiment 7.

After the above described step of supplying functional water, a start signal is sent from the controlling means 40 to the means 32 for controlling gas passing to pass gas through the chlorine gas generation bath 11 at step S3. (In FIG. 4, step S3 is inscribed with "start blowing gas". Steps S8, S16 and S46 in FIGS. 5, 7 and 16, respectively, are done with the same.)

Furthermore, reference numeral 35 denotes chlorine concentration detecting means, and the above described detecting means 40 determines that detection data has reached a predetermined value, and at step S4, a signal is sent to the means 33 for controlling irradiation with light to carry out irradiation with light.

Then, by the light amount detecting means 36, the controlling means 40 determines that detection data has reached a predetermined value, and at step S5, a start signal to give instructions to start supply of the gas is sent to the means 34 for controlling the supply of the gas to be decomposed, and the gas to be decomposed is supplied.

By following the above steps, possibilities that gas to be decomposed is discharged from the outlet pipe 6 without being subjected to the reaction are reduced.

Furthermore, whether or not the amount of chlorine being supplied from functional water has reached a predetermined value, or whether or not the amount of light from the light-irradiating means is equal to or larger than a predetermined value may be determined to give a warning with an alarm if the predetermined value has not been reached yet. The process flow in the case where such the above process is further incorporated into the procedure shown in FIG. 4 is shown in FIG. 5. In FIG. 5, at step S9, an alarm is outputted if the concentration of chlorine after a predetermined amount time is lower than a predetermined value. Also, at step S11, an alarm is outputted if the amount of light has not reached a predetermined value or larger.

Also, the supply of the pollutant is started upon provision of instructions to perform an operation for opening the valve 34 from the controlling means 40. However, operations for checking continuously or regularly at a predetermined time interval that the valve 34 is in the "closed position" during operation of starting supply of functional water, gas passing or irradiation with light, and for providing instructions to trigger an alarm to close the valve 34 and stopping each operation on a temporary basis to take necessary measures may be added in the program.

(Embodiment 2)

In the above described Embodiment 1, the supply of the gas to be decomposed and the gas passing through water (functional water) containing chlorine are carried out individually. On the other hand, in this embodiment, the gas passing through functional water is carried out with the gas to be decomposed.

Figure 6:
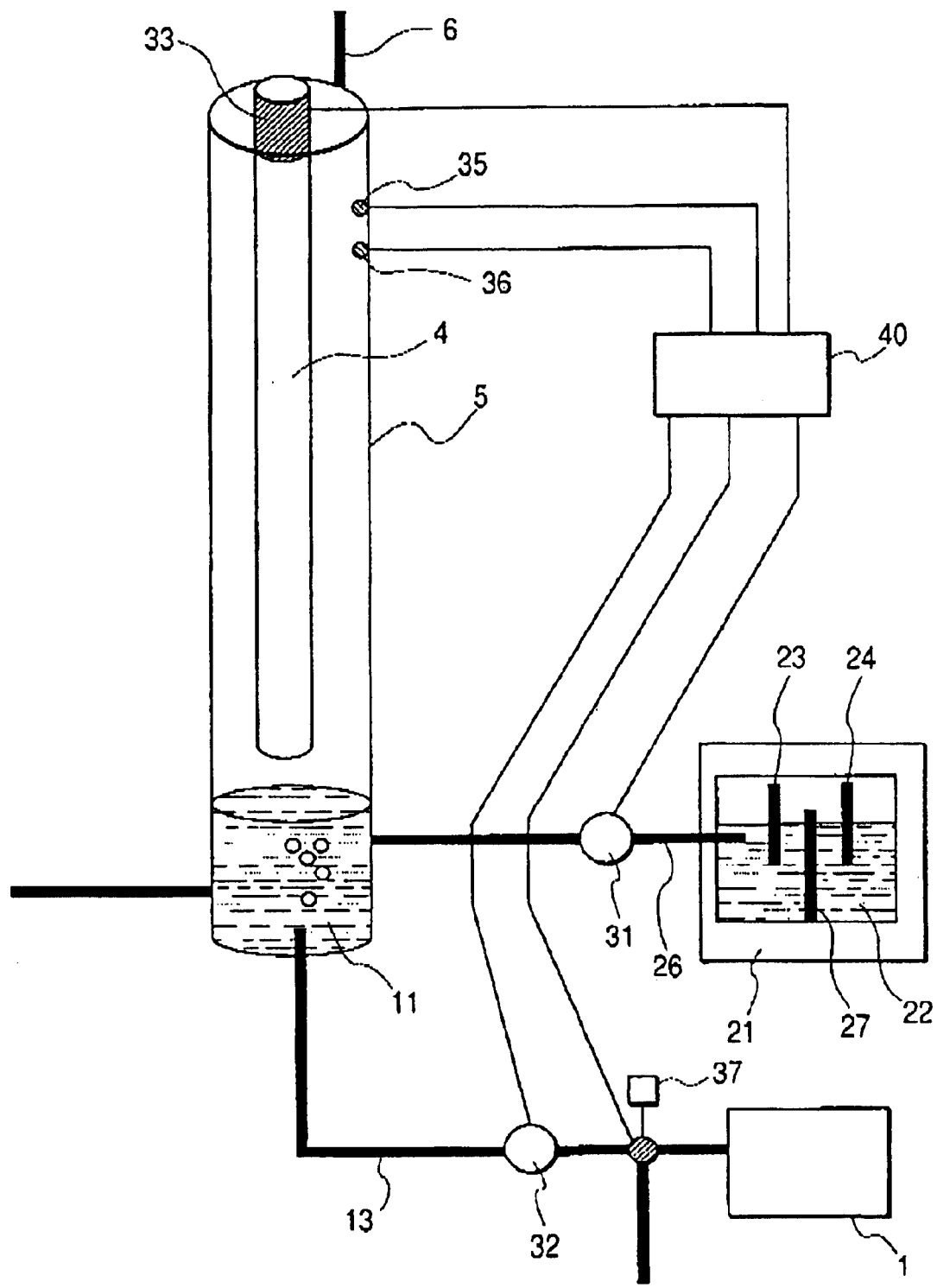
FIG. 6 is a schematic diagram showing the configuration of one embodiment of the apparatus for decomposing pollutants, relating to the present invention.

In FIG. 6, reference numeral 5 denotes the reaction bath, and functional water is stored in the lower part of the reaction bath, and air containing chlorine and a gaseous halogenated aliphatic compound to be decomposed are mixed together in a gas phase portion corresponding to the upper part of the reaction bath 5. Light is radiated within the reaction bath 5 by light-irradiating means 4.

The gaseous halogenated aliphatic compound to be decomposed is supplied from the decomposition target substance supplying means 1. Functional water is continuously supplied at a desired flow rate to the lower part of the reaction bath 5 through the pipe 26 by means 31 for controlling supply of functional water. The functional water is produced in the functional water production apparatus 21. A gas to be passed, which contains the gaseous halogenated aliphatic compound, is continuously supplied at a desired flow rate to the lower part of the reaction bath 5 through the supply pipe 13 and means 32 for controlling gas passing. As a result, a mixed gas including a gas containing a chlorine gas and the gaseous halogenated aliphatic compound to be decomposed is discharged to the gas phase portion corresponding to the upper part of the reaction bath 5. Light is radiated to the mixed gas in the reaction bath 5 by the means 4 for irradiation with light to decompose the compound. Irradiation with light by the means 4 is controlled by means 33 for controlling irradiation with light. Here, reference numeral 37 denotes an electromagnetic valve to make a selection on whether the gas to be passed through the lower part of the reaction bath 5 is the gas containing the decomposition target substance or normal air.

The means 31 for controlling supply of functional water starts supply of functional water upon reception of a start signal. The means 32 for controlling gas passing awaits a gas passing start signal to start passing a gas. The means 33 for controlling irradiation with light awaits a start signal for irradiation with light to start irradiation with light. Reference numeral 35 denotes chlorine concentration detecting means enabling the progress of work to be controlled based on detection data. Reference numeral 36 denotes the light amount detecting means enabling the progress of work to be controlled based on detection data. The electromagnetic valve 37 selects a gas to be passed through the lower part of the reaction bath 5, and the source is selected by a signal providing instructions to select a gas.

Reference numeral 40 denotes controlling means similar to that in the Embodiment 1, which receives signals from 35, 36 and the like to carry out control of start of operations of the means 31, 32 and 33, and control of selection by the valve 37 based on a predetermined procedure.

The procedure of operations carried out by this controlling means 40 will now be described referring to FIG. 7.

First, at step S13, the main switch is turned to the on position to start operations of this decomposition apparatus. That is, receiving information indicating the fact that the main switch has been turned to the on position, in the controlling means 40, a start signal is sent to the means 31 for controlling supply of functional water, and at step S14, supply of functional water to the lower part of the reaction bath 5 is started. After the step of supplying functional water, the controlling means 40 outputs a signal to the electromagnetic valve 37, and at step S15, air is selected as a gas to be passed In addition, a start signal is sent to the means 32 for controlling gas passing, and at step S16, air is passed through the lower part of the reaction bath 5. Reference numeral 35 denotes chlorine concentration detecting means, and the controlling means 40 determines that detection data has reached a predetermined value (yes in step S17), and a signal is sent from the controlling means 40 to the means 33 for controlling irradiation with light, and at step S18, irradiation with light is started.

Then, receiving the output from light amount detecting means 36, the controlling means 40 confirms that detection data has reached a predetermined value (yes in step S19), and a signal is sent from the controlling means 40 to the electromagnetic valve 37, and at step S20, the gas to be decomposed is selected as a gas to be passed, and a signal is sent to the means 32 for controlling gas passing to supply the gas to be decomposed. (The term "gas to be passed" is inscribed with "gas to be blown" in FIG. 7.)

By following the above steps, possibilities that gas to be decomposed is discharged from the outlet pipe 6 without being subjected to reaction are reduced.

(Embodiment 3)

In the above described Embodiments 1 and 2, gas is passed through water containing chlorine as a method for generating a gas containing chlorine. On the other hand, in this embodiment, the water containing chlorine is atomized to promote generation of gas containing chlorine and enhance efficiency of gas-liquid contact for carrying out decomposition reaction.

Figure 8:
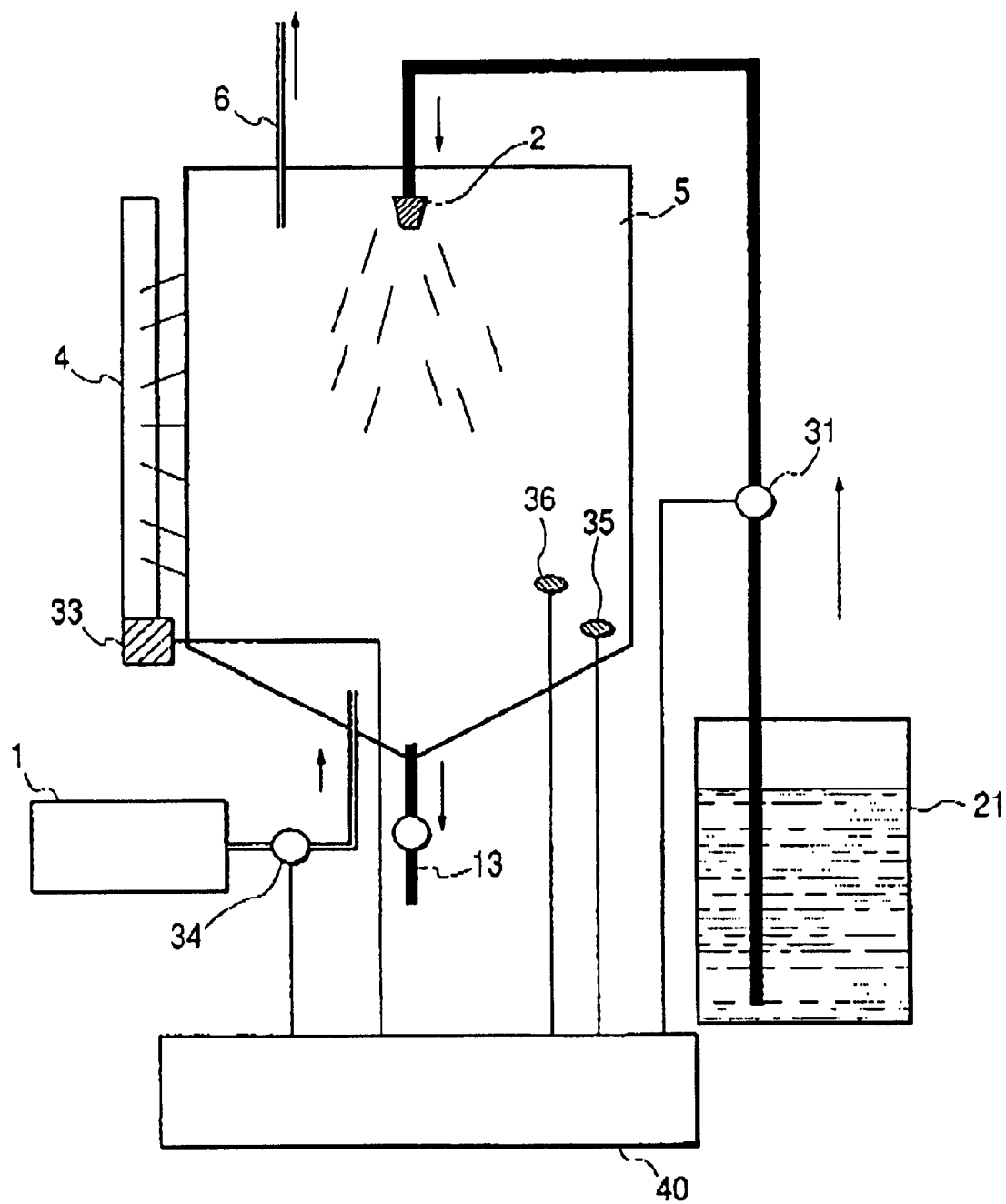
FIG. 8 is a schematic diagram showing the configuration of one embodiment of the apparatus for decomposing pollutants, relating to the present invention.

That is, in FIG. 8, reference numeral 5 denotes the reaction bath, and a nozzle 2 for atomizing and discharging water containing chlorine is provided in the upper part of the reaction bath 5, Functional water is continuously supplied at a desired flow rate through the nozzle 2 of the reaction bath 5 by means 31 for controlling supply of functional water. From the lower part of the reaction bath 5, the decomposition target substance is supplied from decomposition target substance supplying means 1. In the reaction bath 5, the air containing chlorine generated from the functional water is mixed with the gaseous halogenated aliphatic compound to be decomposed. Also, the functional water is contacted with the gaseous halogenated aliphatic compound to be decomposed. Light is radiated within the reaction bath 5 by light-irradiating means 4.

Irradiation with light by the means 4 is controlled by means 33 for controlling irradiation with light. The means 31 for controlling supply of functional water starts supply of functional water upon reception of a start signal. The means 33 for controlling irradiation with light awaits a irradiation with light start signal to start irradiation with light. Reference numeral 34 denotes means for controlling supply of a gas to be decomposed, and supply of the gas to be decomposed is started upon reception of a start signal. Reference numeral 35 denotes a chlorine concentration detecting means enabling the progress of work to be controlled based on detection data. Reference numeral 36 denotes light amount detecting means enabling the progress of work to be controlled based on detection data.

Reference numeral 40 denotes controlling means similar to that in the Embodiment 1, which receives signals from 35, 36 and the like to carry out control of start of operations of the means 31, 33 and 34 based on a predetermined procedure.

Figure 9:
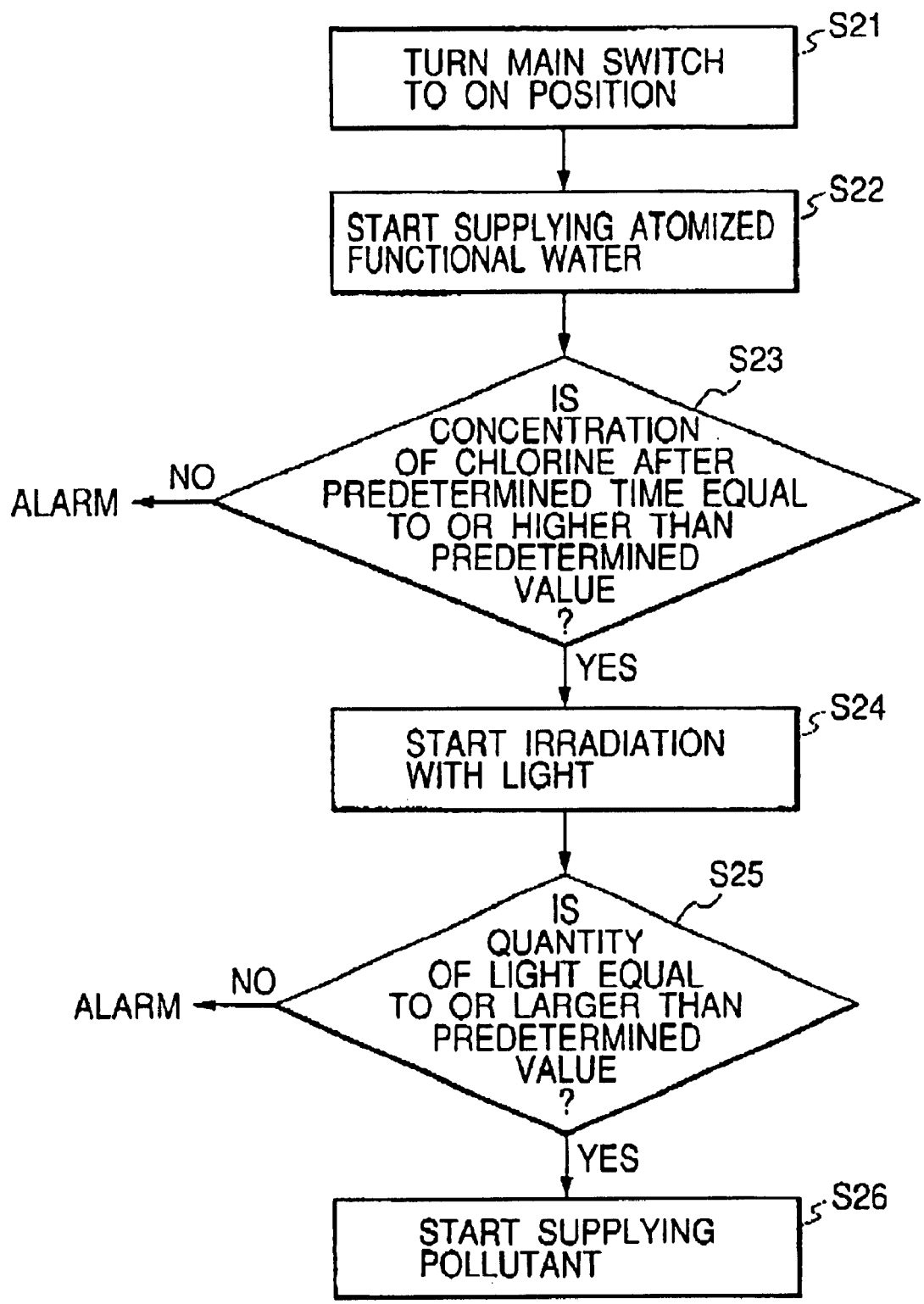
FIG. 9 is a flowchart showing the operation procedure of each means in the apparatus shown in FIG. 8.

The procedure of operations carried out by this controlling means 40 will now be described referring to FIG. 9

First, at step S21, the main switch is turned to the on position to start operations of this decomposition apparatus.

That is, upon reception of information indicating the fact that the main switch is turned to the on position, a start signal is sent from the controlling means 40 to means 31 for controlling supply of function, and at step S22, supply of functional water to the reaction bath is started. The functional water is atomized and discharged to the reaction bath 5 by the nozzle 2. Reference numeral 35 denotes chlorine concentration detecting means, a signal is sent from the controlling means 40 to the means 33 for controlling irradiation with light when the controlling means 40 determines that detection data has reached a predetermined value (yes in step S23), and at step S24, irradiation with light is started.

Then, when the controlling means 40 determines by light amount detecting means 36 that detection data has reached a predetermined value (yes in step S25), a signal is sent from the controlling means 40 to the means 34 for controlling supply of the gas to be decomposed, and at step S26, supply of the gas to be decomposed is started.

By following the above steps, possibilities that gas to be decomposed is discharged from the outlet pipe 6 without being subjected to reaction are reduced.

Furthermore, in the above described Embodiments 1 to 3, irradiation with light is started after the air containing chlorine required for decomposition is generated, but a procedure such that the air containing chlorine required for decomposition is generated after irradiation with light may be adopted. However, also in this procedure, supply and selection of a pollutant is carried out after the air containing chlorine required for decomposition.

(Embodiment 4)

Figure 10:
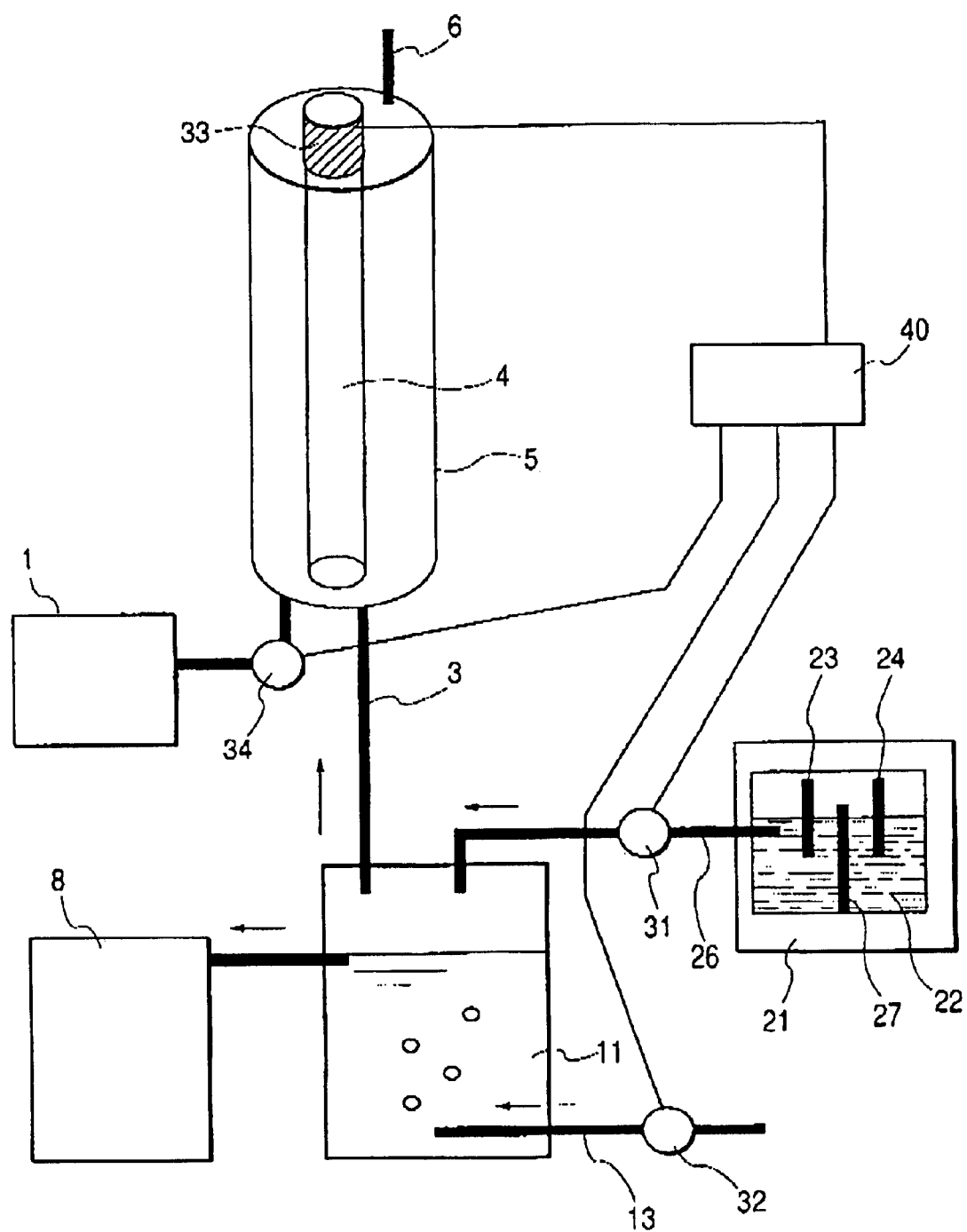
FIG. 10 shows the configuration of one embodiment of the apparatus for decomposing pollutants, relating to the present invention.

The basic configuration of one other embodiment of a decomposition apparatus relating to the present invention will be described below based on FIG. 10. In FIG. 10, reference numeral 5 denotes a reaction apparatus having a gas-liquid reaction area, which is a reaction vessel for mixing together air containing chlorine from the chlorine gas generation bath 11 and a gaseous halogenated aliphatic hydrocarbon compound to be decomposed and storing the same, and the irradiation with light is conducted in the reaction apparatus 5. The gaseous halogenated aliphatic compound to be decomposed is supplied from decomposition target substance supplying means 1.

Supplying of the decomposition target substance is controlled by a means 34 (a valve) for controlling the supply of a decomposition target substance. Water containing chlorine (functional water) is continuously supplied at a desired flow rate to the chlorine gas generation bath 11 through the pipe 26 and controlled by means 31 for controlling supply of functional water. Water containing chlorine is produced in the functional water production apparatus 21. The gas to be passed is continuously supplied at a desired flow rate to the chlorine generation bath 11 through the supply pipe 13 and means 32 (a valve) for controlling gas passing. As a result, a gas containing a chlorine gas is discharged from the outlet pipe 3. This gas containing chlorine is then introduced into the reaction bath 5, and is mixed with the decomposition target substance, and thereafter the inside of the reaction apparatus 5 is irradiated with light by means 4 for irradiation with light to decompose the decomposition target substance. The irradiation with light performed by the means 4 is controlled by means 33 for controlling irradiation with light.

The means 31 for controlling supply of functional water stops supply of functional water upon acquirement of a termination signal. The means 32 for controlling gas passing awaits a gas passing termination signal to stop the gas passing. The means 33 for controlling irradiation with light awaits a irradiation with light termination signal to stop irradiation with light. Reference numeral 34 denotes means for controlling supply of a gas to be decomposed, and supply of the gas to be decomposed is stopped upon reception of a termination signal.

Reference numeral 40 denotes controlling means, which controls the stop of operations of 31, 32, 33 and 34 based on procedures in conformity of a predetermined program.

Figure 11:
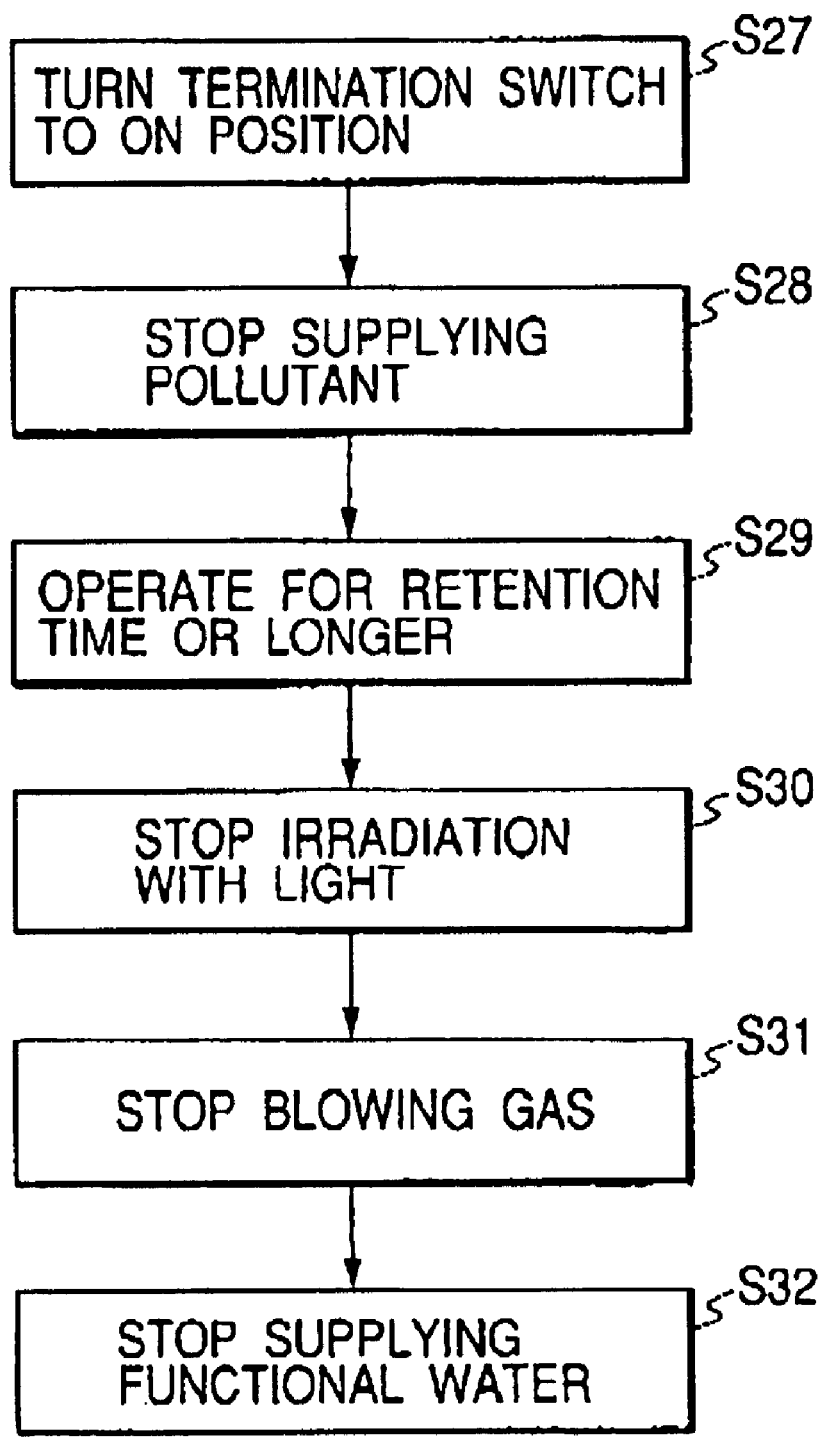
FIG. 11 is a flowchart showing the operation procedure of each means in the apparatus shown in FIG. 10.

The operation procedure carried out by this controlling means 40 will now be described referring to FIG. 11. In other words, steps of stopping operation of this apparatus will be described.

First, at step S27, a termination switch is turned to the on position to enter the procedure for stopping operations of this decomposition apparatus.

That is, upon reception of information indicating that the termination switch has been turned to the on position, instructions to stop decomposition processing are inputted in the controlling means 40. Then, a termination signal providing instructions to stop supplying gas is first sent from the controlling means 40 to the means 34 for controlling supply of a gas to be decomposed, and at step S27, supply of the gas to be decomposed is stopped. When the controlling means 40 determines that operation has been continued for a predetermined time period, desirably for time of retention in the reaction area or longer in this state (step S29), a signal is sent from the controlling means 40 to the means 33 for controlling irradiation with light, and at step S30, irradiation with light is stopped.

Furthermore, the retention time refers to a time period over which the gas to be decomposed is retained In the gas phase reaction portion in the reaction apparatus, and for example, if the volume of the gas phase reaction portion in the reaction apparatus is 4 liters, and the supplied amount of gas to be decomposed is 8 liters/minute, then the retention time is 30 seconds. That is, if the solution of gas phase reaction portion is V and the supplied amount of gas to be decomposed per minute is N, retention time (minutes)=V/N holds. The retention time can also be considered as reaction time involved in decomposition.

Also, at this time, as necessary, the amount of the pollutant in the gas phase in the reaction area may be detected by detecting means to confirm that the reaction area is in a state required for stopping the process before proceeding to a next operation.

Then, a termination signal is sent from the controlling means 40 to the means 32 for controlling gas passing, and the passing of gas through the chlorine gas generation bath 11 is stopped. (Step S31. In FIG. 11, this step is inscribed with "stop blowing gas". Steps S37 and S53 in FIGS. 13 and 16, respectively, are done with the same.)

Finally, a termination signal is sent from the controlling means 40 to the means 31 for controlling supply of functional water, and at step S32, supply of functional water to the means 11 is stopped.

By following the above described steps, possibilities that the substance under the process of decomposition in the reaction vessel is discharged and released into the atmosphere without being decomposed, when operation of the apparatus is stopped in association with interruption and termination of purification processing are reduced.

(Embodiment 5)

Figure 12:
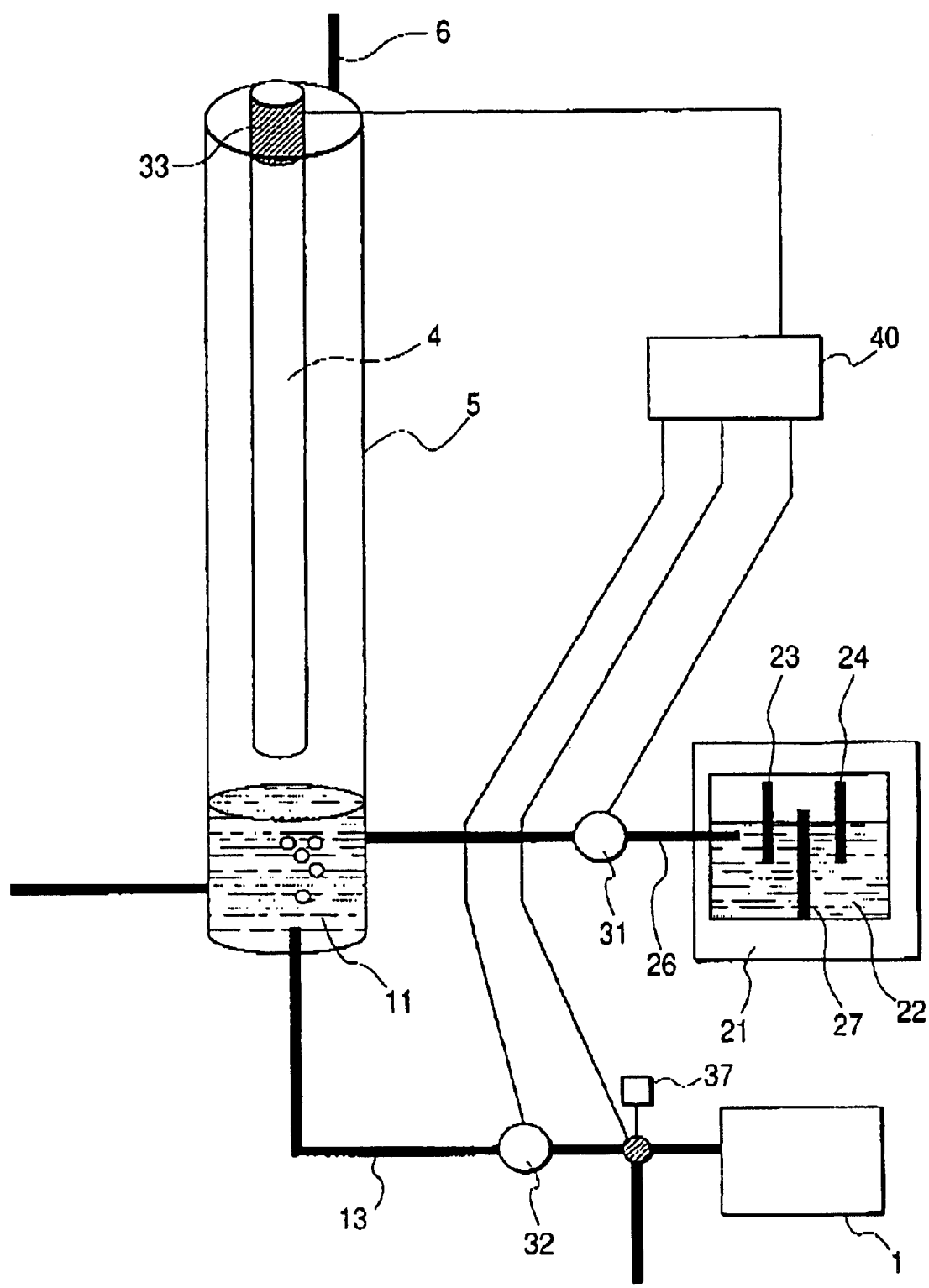
FIG. 12 shows the configuration of one embodiment of the apparatus for decomposing pollutants, relating to the present invention.

In Embodiment 4, supply of the gas to be decomposed and the passing of gas through water containing chlorine (functional water) are carried out individually. On the other hand, in this embodiment, the passing of gas through functional water is carried out with the gas to be decomposed. In FIG. 12, reference numeral 5 denotes the reaction apparatus, and functional water is stored in the lower part of the reaction apparatus, and air containing chlorine and a gaseous halogenated aliphatic compound to be decomposed are mixed together in a gas phase portion corresponding to the upper part of the reaction apparatus 5. Light is radiated within the reaction apparatus 5 by light-irradiating means 4.

The gaseous halogenated aliphatic compound to be decomposed is supplied from the decomposition target substance supplying means 1. Functional water is continuously supplied at a desired flow rate to the lower part of the reaction apparatus 5 through the pipe 26 and controlled by means 31 for controlling supply of functional water. The functional water is produced in the functional water production apparatus 21. A gas to be passed, which contains the gaseous halogenated aliphatic compound to be decomposed, is continuously supplied at a desired flow rate to the lower part of the reaction apparatus 5 through the supply pipe 13 and means 32 for controlling gas passing. As a result, a mixed gas including a gas containing a chlorine gas and the gaseous halogenated aliphatic compound to be decomposed is discharged to the gas phase portion corresponding to the upper part of the reaction apparatus 5. Light is radiated to the mixed gas in the reaction apparatus 5 by the means 4 for irradiation with light to decompose the compound. Irradiation with light by the means 4 is controlled by means 33 for controlling irradiation with light. Here, reference numeral 37 denotes an electromagnetic valve to make a selection on whether the gas to be passed through the lower part of the reaction apparatus 5 is the gas containing the decomposition target substance or normal air.

Here, the means 31 for controlling supply of functional water stops supply of functional water upon reception of a termination signal. The means 32 for controlling gas passing awaits a gas passing termination signal to stop gas passing. The means 33 for controlling irradiation with light awaits a irradiation with light termination signal to stop irradiation with light. The electromagnetic valve 37 selects a gas to be passed through the lower part of the reaction bath 5, and a source is selected by a signal providing instructions to select a gas.

Reference numeral 40 denotes controlling means, which carries out control of start of operations of the means 31, 32 and 33, and control of selection by the valve 37 based on a predetermined procedure.

Figure 13:
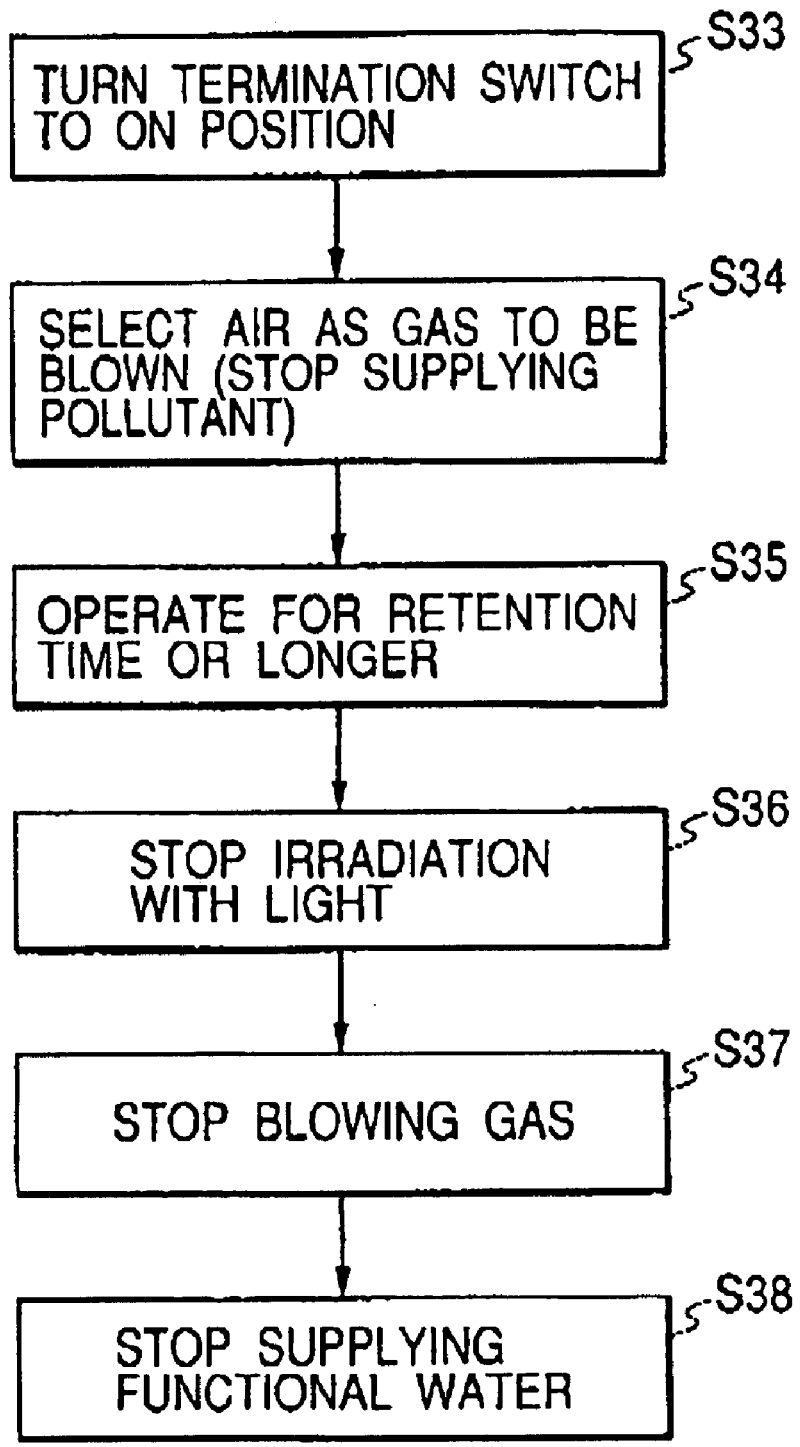
FIG. 13 is a flowchart showing the operation procedure of each means in the apparatus shown in FIG. 12.

The procedure of operations carried out by this controlling means 40 will now be described referring to FIG. 13. In other words, steps of operations of this apparatus will be described.

First, at step S33, a termination switch is turned to the on position to enter the procedure for stopping operation of this decomposition apparatus.

That is, upon reception of information indicating the fact that the termination switch has been turned to the on position, a signal is first sent from the controlling means 40 to the electromagnetic valve 37, and at step S34, air is selected as a gas to be passed in place of the gas to be decomposed to stop supply of the pollutant. After the controlling means 40 determines that operation has been continued for a predetermined time period, desirably for the retention time in the reaction area or longer in this state (step S35), a signal is sent from the controlling means 40 to the means 33 for controlling irradiation with light, and at step S36, irradiation with light is stopped.

Then, a termination signal is sent from the controlling means 40 to the means 32 for controlling gas passing, and at step S37, the passing of gas through the layer of functional water in the lower part of the reaction apparatus 5 is stopped.

Finally, at step S38, a termination signal is sent from the controlling means 40 to the means 31 for controlling supply of functional water to supply of functional water to the reaction apparatus 5 is stopped. Thereby, operation of the apparatus is stopped, and the process proceeds to steps of draining functional water in the reaction apparatus 5 and so on if necessary.

By following the above described steps, possibilities that the substance under the process of decomposition in the reaction vessel is discharged and released into the atmosphere without being decomposed, when operation of the apparatus is stopped in association with interruption and termination of purification processing are reduced.

(Embodiment 6)

In the above described Embodiments 4 and 5, gas is passed through water containing chlorine as a method for generating a gas containing chlorine. On the other hand, in this embodiment, the water containing chlorine is atomized to promote generation of gas containing chlorine and enhance efficiency of gas-liquid contact for carrying out decomposition reaction.

Figure 14:
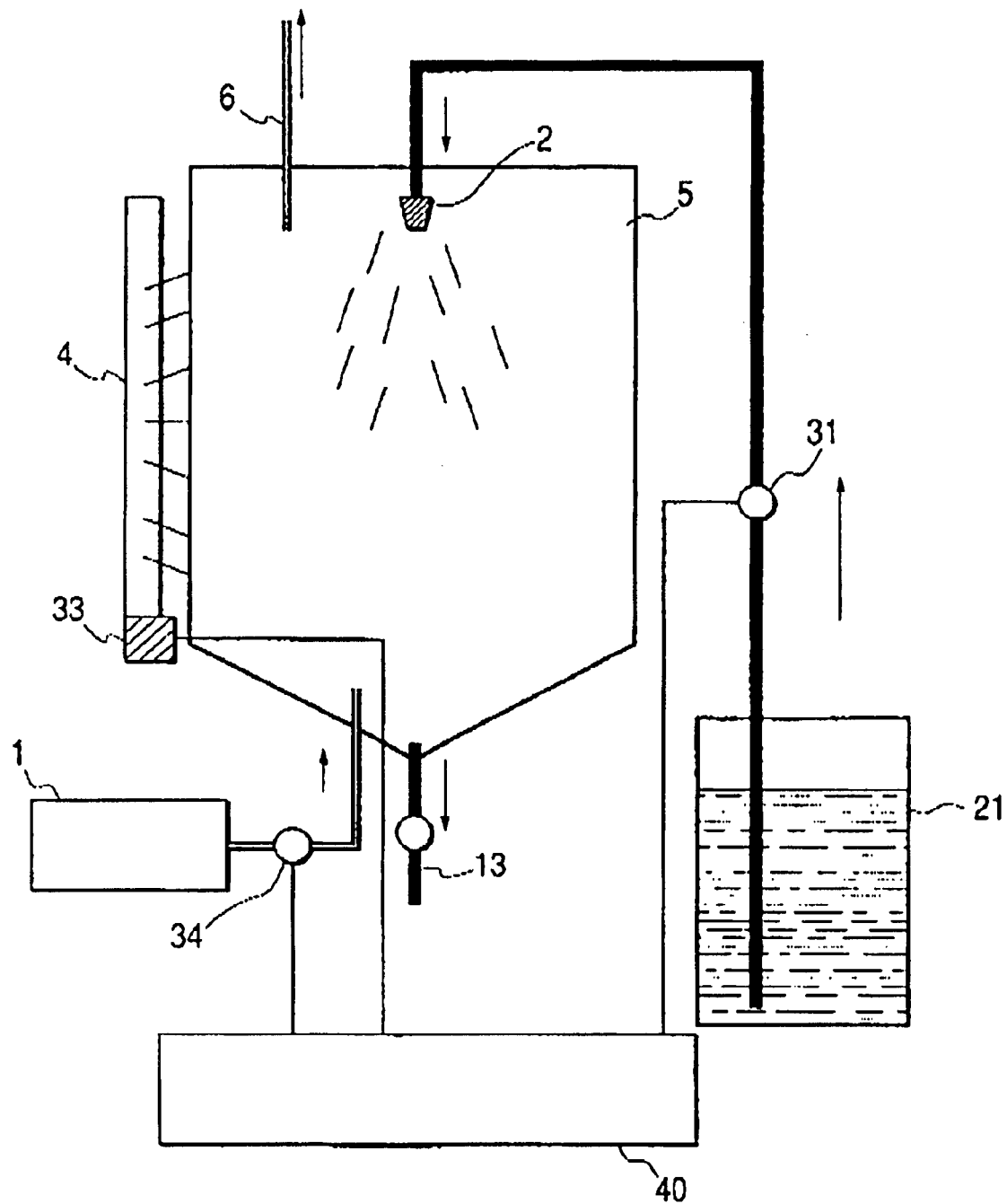
FIG. 14 shows the configuration of one embodiment of the apparatus for decomposing pollutants, relating to the present invention.

That is, in FIG. 14, reference numeral 5 denotes the reaction apparatus, and a nozzle 2 for atomizing and discharging water containing chlorine is provided in the upper part of the reaction apparatus 5. Functional water is continuously supplied at a desired flow rate through the nozzle 2 of the reaction apparatus 5 by means 31 for controlling supply of functional water. From the lower part of the reaction apparatus 5, the decomposition target substance is supplied from decomposition target substance supplying means 1. In the reaction apparatus 5, the air containing chlorine generated from the functional water is mixed with the gaseous halogenated aliphatic compound to be decomposed. Also, the functional water is contacted with the gaseous halogenated aliphatic compound to be decomposed. Light is radiated within the reaction apparatus 5 by light-irradiating means 4.

Here irradiation with light by the means 4 is controlled by means 33 for controlling irradiation with light. The means 31 for controlling supply of functional water stops supply of functional water upon reception of a termination signal. The means 33 for controlling irradiation with light awaits a irradiation with light termination signal to stop irradiation with light. Reference numeral 34 denotes means for controlling supply of a gas to be decomposed, and supply of the gas to be decomposed is stopped upon reception of a termination signal.

Figure 15:
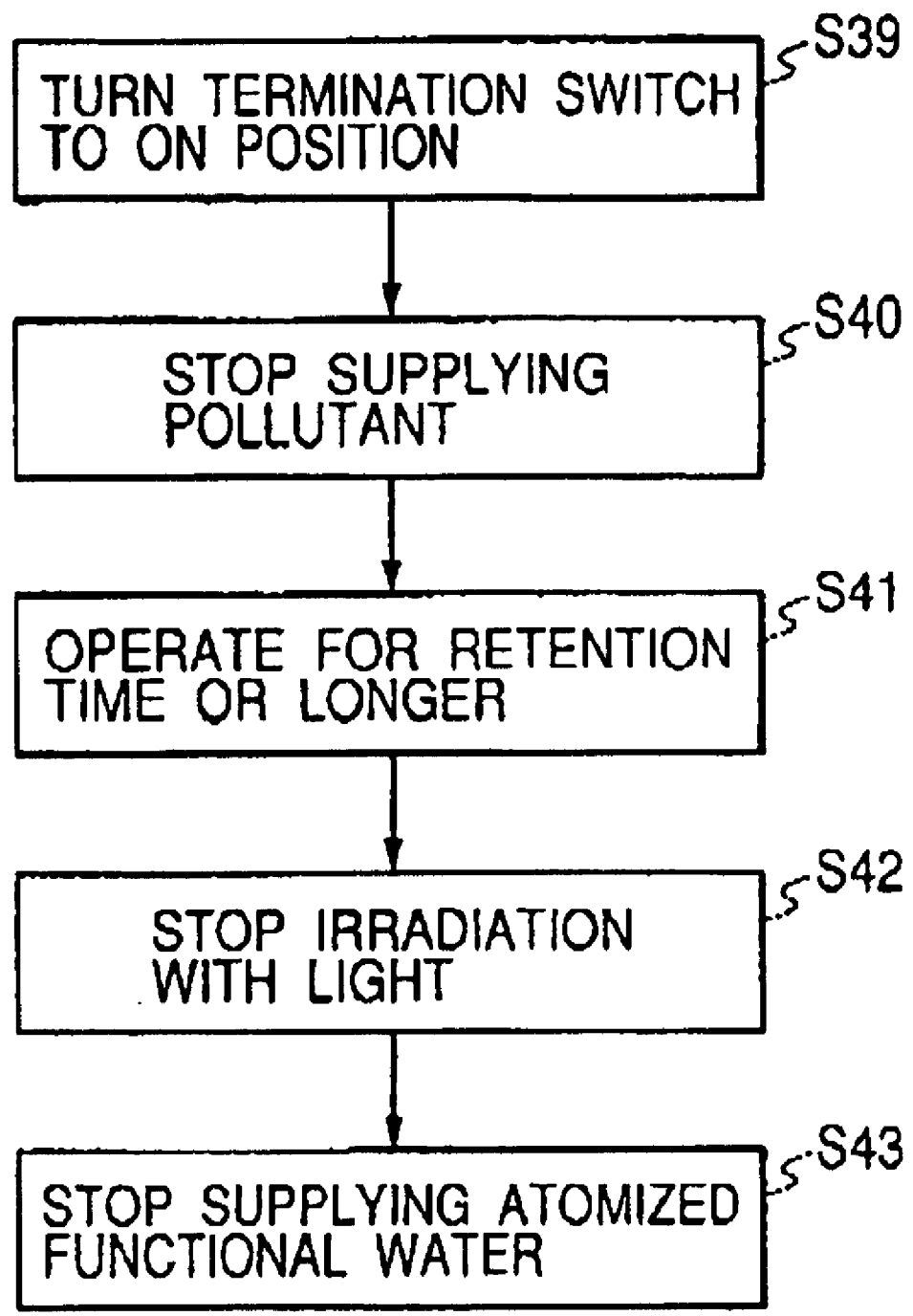
FIG. 15 is a flowchart showing the operation procedure of each means in the apparatus shown in FIG. 14.

Reference numeral 40 denotes controlling means, which carries out control of start of operations of the means 31, 33 and 34 based on a predetermined procedure. The procedure of operations carried out by this controlling means 40 will now be described referring to FIG. 15.

First, at step S39, a termination switch is turned to the on position to enter the procedure for stopping operation of this decomposition apparatus That is, upon reception of information indicating the fact that the termination switch has been turned to the on position, a termination signal providing instructions to stop supplying gas is sent from the controlling means 40 to the means 34 for controlling supply a gas to be decomposed, and supply of the pollutant gas to be decomposed is stopped (step S40).

After the controlling means 40 determines that operation has been continued for a predetermined time period, desirably for retention time in the reaction area or longer in this state at step S41, a signal is sent from the controlling means 40 to the means 33 for controlling irradiation with light, and irradiation with light is stopped (step S42). Then, a signal is sent from the controlling means 40 to the means 31 for controlling supply of functional water, and supply of functional water is stopped (step S43).

By following the above described steps, possibilities that the substance under the process of decomposition in the reaction vessel is discharged and released into the atmosphere without being decomposed, when operation of the apparatus is stopped in association with interruption and termination of purification processing are reduced.

In the above described Embodiments 4, 5 and 6, generation of the air containing chlorine required for decomposition is stopped after irradiation with light is stopped, a procedure such that generation of the air containing chlorine required for decomposition is stopped before irradiation with light is stopped may be adopted. However, also in this procedure, supply of a pollutant is stopped before supply of the air containing chlorine required for decomposition is stopped.

Furthermore, the decomposition apparatus in each Embodiment may be operated in a variety of modes such as a batch mode and continuous operation mode.

(Embodiment 7)

The basic configuration of one other embodiment relating to the present invention will now be described below. This Embodiment 7 has the form of a combination of the above described Embodiments 1 and 6. Using the configuration of the decomposition apparatus shown in FIG. 3, the operation procedure for control carried out by controlling means 40 in accordance with a program will be described using FIG. 16.

First, at step S44, the main switch is turned to the on position to start operation of this decomposition apparatus. That is, upon reception of information indicating the fact that the main switch has been turned to the on position, the above described controlling means carries out procedures for starting decomposition processing. Then, at step S45, a signal is sent to means 31 for controlling supply of functional water to start supply of functional water to the chlorine gas generation bath 11.

After the above described step of supplying functional water, at step S46, a start signal is sent from the controlling means to means 32 for controlling gas passing to pass gas through the chlorine gas generation bath 11.

Furthermore, reference numeral 35 denotes chlorine concentration detecting means, and the above described controlling means 40 determines that detection data has reached a predetermined value, and at step S47, a signal is sent to means 33 for control irradiation with light to conduct the irradiation with light.

Then, the controlling means 40 determines by light amount detecting means 36 that detection data has reached a predetermined value, and at step S48, a start signal to provide instructions to start supply of gas is sent to means 34 for controlling supply of gas to be decomposed to supply the gas to be decomposed.

By following the above described steps, possibilities that gas to be decomposed is discharged from the outlet pipe 6 without being subjected to the reaction are reduced.

Then, at step S49, the termination switch is turned to the on position to enter the procedure for stopping operation of this decomposition apparatus.

That is, upon reception of information indicating the fact that the termination switch has been turned to the on position, instructions to stop decomposition processing are inputted in the controlling means 40. First, a termination signal providing instructions to stop supply of gas is sent to the means 34 for controlling supply of gas to be decomposed, and at step S50, supply of the gas to be decomposed is stopped. When the controlling means 40 determines that operation has been continued for a predetermined time period, desirably for time of retention in the reaction area or longer in this state (step S51), a signal is sent from the controlling means 40 to the means 33 for controlling irradiation with light, and at step S52, irradiation with light is stopped.

Furthermore, the retention time refers to a time period over which the gas to be decomposed is retained in the gas phase reaction portion in the reaction apparatus, and for example, if the volume of the gas phase reaction portion in the reaction apparatus is 4 liters, and the supplied amount of gas to be decomposed is 8 liters/minute, then the retention time is 30 seconds. That is, if the solution of gas phase reaction portion is V and the supplied amount of gas to be decomposed per minute is N, retention time (minutes)=V/N holds. The retention time can also be considered as reaction time involved in decomposition.

Also, at this time, as necessary, the amount of the pollutant in the gas phase in the reaction area may be detected by detecting means to confirm that the reaction area is in a state required for stopping the process before proceeding to a next operation.

Then, a termination signal is sent from the controlling means 40 to the means 32 for controlling gas passing, and the passing of gas through the chlorine gas generation bath 11 is stopped (step S53).

Finally, a termination signal is sent from the controlling means 40 to the means 31 for controlling supply of functional water, and at step S54, supply of functional water to the means 11 is stopped.

By following the above described steps, possibilities that the substance under the process of decomposition in the reaction vessel is discharged and released into the atmosphere without being decomposed, when operation of the apparatus is stopped in association with interruption and termination of purification processing are reduced.

In this way, according to Embodiment 7, both the effect of reducing possibilities that the gas to be decomposed is discharged from the outlet pipe without being subjected to reaction at the time of starting decomposition of a pollutant, and that the substance to be decomposed under the process of decomposition in the reaction vessel is discharged and released into the atmosphere without being decomposed when operation of the apparatus is stopped in association with interruption and termination of purification processing can be obtained.

As described above, according to the present invention, each operation is started in the above described specified order at the time of starting decomposition processing, whereby the amount of undecomposed pollutant that is discharged during process beginning with start of decomposition reaction through the initial stage can be reduced, thus making it possible to eliminate burdensome operations for decomposing separately the undecomposed pollutant discharged at the time of starting decomposition to carry out more efficient decomposition processing.

Also, each operation is stopped in the above described specified order at the time of stopping decomposition processing, whereby the amount of undecomposed pollutant remaining at the time of stopping decomposition processing can be reduced, thus making it possible to eliminate burdensome operations for decomposing the undecomposed pollutant at the time of stopping decomposition processing to carry out more efficient decomposition processing.

What is claimed is:

1. A method of decomposing a substance in which a decomposition target substance and a decomposition promoting substance, which is capable of decomposing said decomposition target substance under irradiation with light, are introduced into a decomposition area for decomposing the decomposition target substance, and those substances are contacted with each other while they are in a gas phase under irradiation with light to decompose the decomposition target substance, the method comprising the steps of:

(a) introducing said decomposition promoting substance into said decomposition area;

(b) irradiating said decomposition area with light; and (c) introducing the decomposition target substance into said decomposition area, wherein the steps are started in the order of said steps (a), (b) and (c), the step (a) the earliest, at the time of starting the operation of decomposing said decomposition target substance, and said steps are stopped in the order of (c), (b) and (a), the step (c) the earliest, at the time of ending the operation of decomposing said decomposition target substance.

2. The method according to claim 1, wherein said decomposition promoting substance is chlorine.

3. The method according to claim 2, wherein introduction of said chlorine into said decomposition area is carried out by introducing a gas containing chlorine, prepared by contacting a gas supplied to an area storing therein functional water having a function to generate chlorine with the functional water existing in the functional water storage area, into said decomposition area.

4. The method according to claim 3, wherein introduction of said decomposition target substance and said chlorine into said decomposition area is carried out by introducing into said decomposition area a gas containing the decomposition target substance and chlorine prepared by contacting a gas containing the decomposition target substance supplied to said functional water storage area with said functional water existing in the functional water storage area.

5. The method according to claim 4, wherein introduction of said decomposition target substance and said chlorine into said decomposition area is stopped by substituting a gas not containing the decomposition target substance for the gas containing the decomposition target substance to be supplied to said functional water storage area.

6. The method according to claim 3, wherein the functional water contains hypochlorous ion.

7. The method according to claim 3, wherein the functional water is acidic water produced in the vicinity of a positive electrode by electrolysis of water containing an electrolyte.

8. The method according to claim 7, wherein the electrolyte is at least one of sodium chloride and potassium chloride.

9. The method according to claim 3, wherein the functional water is a mixture of acidic water produced in the vicinity of a positive electrode and alkaline water produced in the vicinity of a negative electrode by electrolysis of water containing an electrolyte.

10. The method according to claim 9, wherein the mixture is obtained by mixing the acidic water with the alkaline water at an acidic water to alkaline water ratio of 1:1 or lower by volume.

11. The method according to claim 3, wherein the functional water is a hypochlorite solution.

12. The method according to claim 11, wherein the hypochlorite is at least one selected from the group consisting of sodium hypochlorite and potassium hypochlorite.

13. The method according to claim 11, wherein the functional water further contains an inorganic acid or an organic acid.

14. The method according to claim 13, wherein the inorganic acid or organic acid is at least one compound selected from the group consisting of hydrochloric acid, fluoric acid, sulfuric acid, phosphoric acid, boric acid, acetic acid, formic acid, malic acid, citric acid and oxalic acid.

15. The method according to claim 3, wherein the functional water, has a pH from 1 to 4, an oxidation-reduction potential from 800 to 1500 mV, and a concentration of chlorine from 5 to 150 mg/L.

16. The method according to claim 3, wherein the functional water, has a pH from 4 to 10, an oxidation-reduction potential from 300 to 1100 mV, and a concentration of chlorine from 2 to 100 mg/L.

17. The method according to claim 3, wherein introduction of said decomposition target substance into said decomposition area is stopped by substituting a gas not containing the decomposition target substance for the gas to be supplied to said functional water storage area.

18. The method according to claim 1, wherein the light includes light with wavelengths in the range of from 300 to 500 nm.

19. The method according to claim 18, wherein the light includes light with wavelengths in the range of from 350 to 450 nm.

20. The method according to claim 1, wherein the amount of the light with which the irradiation is carried out is in the range of from 10 $\mu$W/cm$^2$ to 10 mW/cm$^2$.

21. The method according to claim 20, wherein the amount of the light with which the irradiation is carried out is in the range of from 50 $\mu$W/cm$^2$ to 5 mW/cm$^2$.

22. The method according to claim 1, wherein said decomposition target substance is a halogenated aliphatic hydrocarbon compound.

23. The method according to claim 22, wherein said halogenated aliphatic hydrocarbon compound is an aliphatic hydrocarbon compound comprised of an atom substituted with chlorine atom.

24. The method according to claim 23, wherein the halogenated aliphatic hydrocarbon compound is at least one selected from the group consisting of trichloroethylene, 1,1,1-trichloroethane, chloroethylene, tetrachloroethylene, 1,1-dichloroethylene, cis-1,2-dichloroethylene, trans-1,2-dichloroethylene, trichloromethane (chloroform) and dichloromethane.

25. A method of decomposing a substance in which a decomposition target substance and a decomposition promoting substance, which is capable of decomposing said decomposition target substance under irradiation with light, are introduced into a decomposition area for decomposing the decomposition target substance, and those substances are contacted with each other while they are in a gas phase under irradiation with light to decompose the decomposition target substance, the method comprising the steps of:

(a) introducing said decomposition promoting substance into said decomposition area;

(b) irradiating said decomposition area with light; and (c) introducing the decomposition target substance into said decomposition area, wherein the steps are started in the order of said steps (a), (b) and (c), the step (a) the earliest, at the time of starting the operation of decomposing said decomposition target substance.

26. A method of decomposing a substance in which a decomposition target substance and a decomposition promoting substance, which is capable of decomposing said decomposition target substance under irradiation with light, are introduced into a decomposition area for decomposing the decomposition target substance, and those substances are contacted with each other while they are in a gas phase under irradiation with light to decompose the decomposition target substance, the method comprising the steps of:

(a) introducing said decomposition promoting substance into said decomposition area;

(b) irradiating said decomposition area with light; and (c) introducing the decomposition target substance into said decomposition area, wherein the steps are stopped in the order of said steps (c), (b) and (a), the step (c) the earliest, at the time of stopping the operation of decomposing said decomposition target substance.

* * * * *